US011354902B2

(12) United States Patent
Ananthanarayanan et al.

(10) Patent No.: US 11,354,902 B2
(45) Date of Patent: *Jun. 7, 2022

(54) QUERYING VIDEO DATA WITH REDUCED LATENCY AND COST

(71) Applicant: Microsoft Technology Licensing, LLC, Redmond, WA (US)

(72) Inventors: Ganesh Ananthanarayanan, Bellevue, WA (US); Paramvir Bahl, Bellevue, WA (US); Peter Bodik, Kirkland, WA (US); Tsuwang Hsieh, Redmond, WA (US); Matthai Philipose, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,080

(22) Filed: May 15, 2020

(65) Prior Publication Data

US 2020/0334465 A1     Oct. 22, 2020

Related U.S. Application Data

(63) Continuation of application No. 15/971,563, filed on May 4, 2018, now Pat. No. 10,685,235.

(Continued)

(51) Int. Cl.
*G06V 20/40* (2022.01)
*G06K 9/62* (2022.01)

(52) U.S. Cl.
CPC ........... *G06V 20/41* (2022.01); *G06K 9/6218* (2013.01); *G06K 9/6227* (2013.01);
(Continued)

(58) Field of Classification Search
CPC combination set(s) only.
See application file for complete search history.

(56) References Cited

U.S. PATENT DOCUMENTS 9,665,802 B2 * 5/2017 Wang ..................... G06V 10/82
10,685,235 B2 * 6/2020 Ananthanarayanan .....................
G06K 9/6218

(Continued)

OTHER PUBLICATIONS

"U.S. Appl. No. 15/971,563, Examiner Interview Summary dated Jan. 10, 2020", 3 pgs.

(Continued)

*Primary Examiner* — Tsung Yin Tsai
(74) *Attorney, Agent, or Firm* — Schwegman Lundberg & Woessner, P.A.

(57) ABSTRACT

A method can include classifying, using a compressed and specialized convolutional neural network (CNN), an object of a video frame into classes, clustering the object based on a distance of a feature vector of the object to a feature vector of a centroid object of the cluster, storing top-k classes, a centroid identification, and a cluster identification, in response to receiving a query for objects of class X from a specific video stream, retrieving image data for each centroid of each cluster that includes the class X as one of the top-k classes, classifying, using a ground truth CNN (GT-CNN), the retrieved image data for each centroid, and for each centroid determined to be classified as a member of the class X providing image data for each object in each cluster associated with the centroid.

20 Claims, 9 Drawing Sheets

Related U.S. Application Data

(60) Provisional application No. 62/611,297, filed on Dec. 28, 2017.

(52) U.S. Cl.
CPC ......... *G06K 9/6256* (2013.01); *G06K 9/6269* (2013.01); *G06V 20/40* (2022.01)

(56) References Cited

U.S. PATENT DOCUMENTS

| | | | |
|---|---|---|---|
| 2016/0140424 A1* | 5/2016 | Wang | G06K 9/6267 382/156 |
| 2017/0344900 A1* | 11/2017 | Alzahrani | G06F 16/48 |
| 2018/0025249 A1* | 1/2018 | Liu | G06V 10/82 382/158 |
| 2019/0205649 A1* | 7/2019 | Ananthanarayanan | G06K 9/6256 |

OTHER PUBLICATIONS

"U.S. Appl. No. 15/971,563, Non Final Office Action dated Oct. 24, 2019", 9 pgs.

"U.S. Appl. No. 15/971,563, Notice of Allowance dated Feb. 5, 2020", 9 pgs.

"U.S. Appl. No. 15/971,563, Response filed Jan. 6, 2020 to Non Final Office Action dated Oct. 24, 2019", 13 pgs.

\* cited by examiner

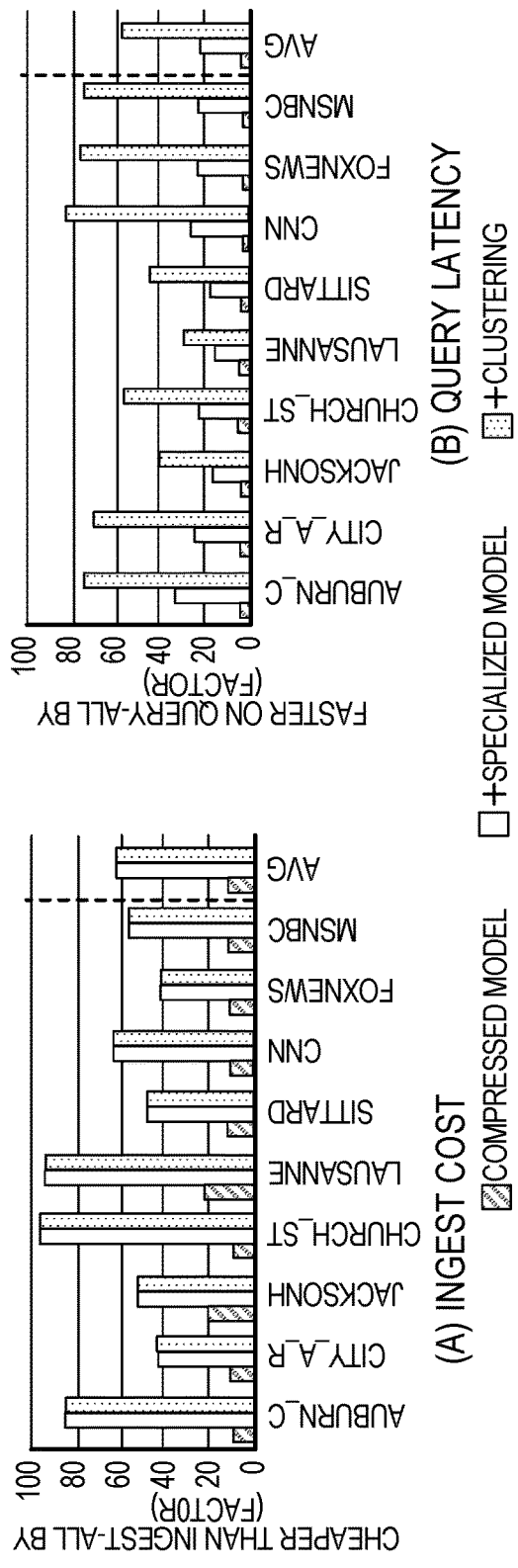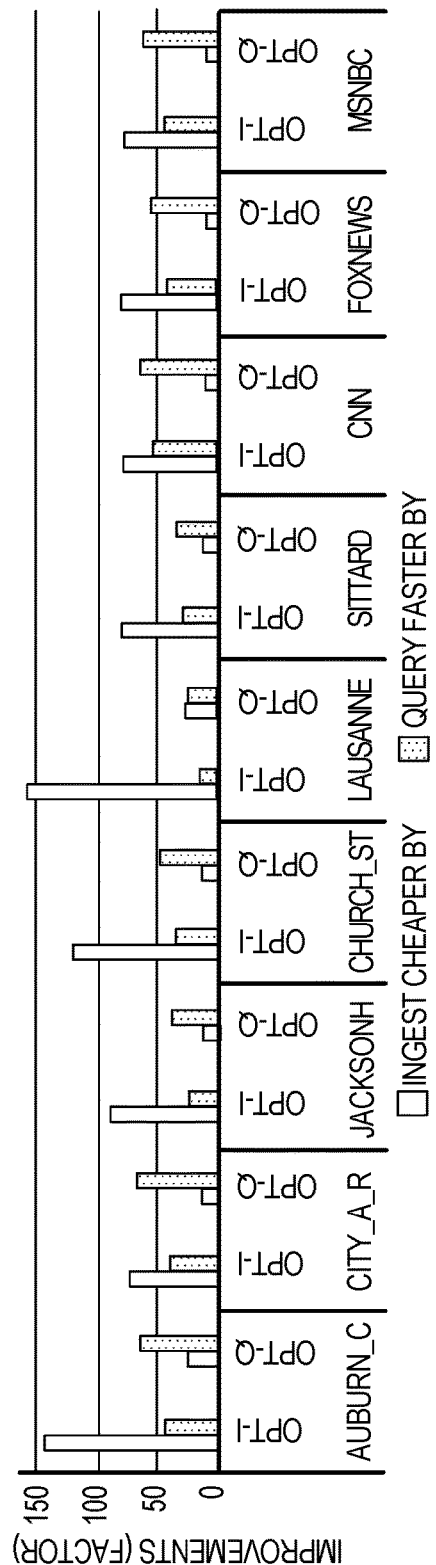
FIG. 7
FIG. 8

QUERYING VIDEO DATA WITH REDUCED LATENCY AND COST

CROSS-REFERENCE TO RELATED APPLICATIONS

This application is a continuation of and claims priority to U.S. patent application Ser. No. 15/971,563, filed May 4, 2018, and entitled, "QUERYING VIDEO DATA WITH REDUCED LATENCY AND COST," which claims priority to U.S. Provisional Patent Application No. 62/611,297, filed on Dec. 28, 2017, and entitled "QUERYING VIDEO DATA WITH REDUCED LATENCY AND COST," the contents of these prior applications are considered part of this application, and are hereby incorporated by reference in their entirety.

BACKGROUND

Cameras are ubiquitous, with millions of them deployed by government and private entities at traffic intersections, enterprise offices, and retail stores. Video from at least some of these cameras are continuously recorded. One of the main purposes for recording the videos is answering "after-the-fact" queries. An after-the-fact query can include identifying video frames with objects of certain classes (e.g., cars or bags) over many days of recorded video. As results from these queries are used by analysts and investigators, achieving low query latencies, while maintaining query accuracy, can be advantageous.

Advances in convolutional neural networks (CNNs), backed by copious training data and hardware accelerators (e.g., GPUs), have led to high accuracy in the computer vision tasks like object detection and object classification. For example, the ResNet152 object classifier CNN won the ImageNet challenge that evaluates classification accuracy on 1,000 classes using a public image dataset with labeled ground truths. For each image, these classifiers return a ranked list of 1,000 classes in decreasing order of confidence.

Despite the accuracy of conventional image classifier CNNs (like ResNet152), using them for video analytics queries is both expensive and slow. Using the ResNet152 classifier at query-time to identify video frames with cars on a month-long traffic video includes 280 GPU hours and cost a significant amount of money to use the corresponding computing cloud. The latency for running queries is also high. To achieve a query latency of one minute on 280 GPU hours of work would involve tens of thousands of GPUs classifying the frames of the video in parallel, which is many orders of magnitude more than what is typically provided (few tens or hundreds) by traffic jurisdictions or retail stores.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

At least one machine-readable storage medium can include instructions for execution by processing circuitry to perform operations comprising classifying, using a compressed and specialized convolutional neural network (CNN) implemented by the processing circuitry, an object of a video frame into classes, clustering the object based on a distance of a feature vector of the object to a feature vector of a centroid object of the cluster, storing, for each object, image data, top-k classes of the classes, a centroid identification indicating a centroid of the cluster, and a cluster identification indicating the cluster associated with the centroid, for each centroid determined to be classified as a member of the class X, by a ground truth CNN (GT-CNN) implemented by the processing circuitry, providing image data for each object in each cluster associated with the centroid.

A method, performed by at least one processor of a computing system, can include classifying, using a compressed and specialized convolutional neural network (CNN), an object of a video frame into classes, clustering the object based on a distance of a feature vector of the object to a feature vector of a centroid object of the cluster, storing, for each object, image data, top-k classes of the classes, a centroid identification indicating a centroid of the cluster, and a cluster identification indicating the cluster associated with the centroid, in response to receiving a query for objects of class X from a specific video stream, retrieving image data for each centroid of each cluster that includes the class X as a member of the stored top-k classes, classifying, using a ground truth CNN (GT-CNN), the retrieved image data for each centroid, and for each centroid determined to be classified as a member of the class X, by the GT-CNN, providing image data for each object in each cluster associated with the centroid.

A system can include circuitry to implement a plurality of compressed and specialized convolutional neural networks (CNNs) trained to classify an object of a video frame into classes and a ground truth CNN (GT-CNN) trained to classify image data of a centroid of a cluster of clusters of objects, a processor, and a memory device coupled to the processor, the memory device including a program stored thereon for execution by the processor to perform operations, the operations comprising clustering the object based on a distance of a feature vector of the object to a feature vector of a centroid object of the cluster, storing, in the memory and for each object, a frame identification indicating one or more frames in which the object is present, top-k classes of the classes, a centroid identification indicating a centroid of the cluster, and a cluster identification indicating the cluster associated with the centroid, and for each centroid determined to be classified as a member of a class X of the classes, by the ground truth CNN (GT-CNN), providing the one or more frames associated with the frame identification for each object in each cluster associated with the centroid.

BRIEF DESCRIPTION OF THE DRAWINGS

FIG. 7 illustrates, by way of example, the breakdown of ingest-time cost and query latency across different design points.

FIG. 8 illustrates, by way of example, a graph that illustrates the (I, Q) values for both opt-ingest (Opt-I) and opt-query (Opt-Q) for the representative videos.

DETAILED DESCRIPTION

Figure 1:
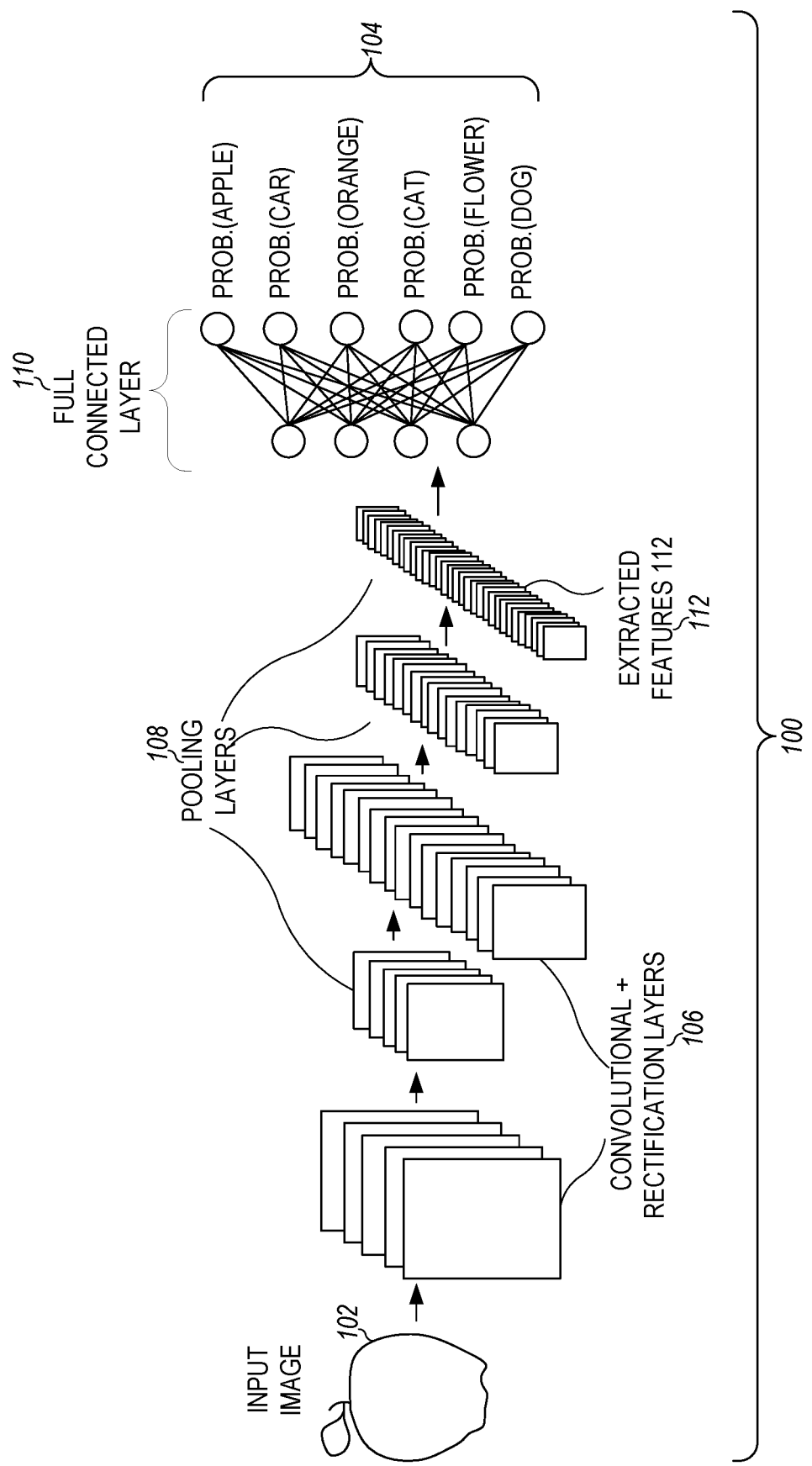
FIG. 1 illustrates, by way of example, a diagram of embodiments of a CNN.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Discussed herein are embodiments that may include querying video datasets (or other large datasets) at reduced cost and latency. Reduced latency is an amount of time it takes to perform the query. Reduced cost is actual dollar cost and/or compute resource cost. Embodiments can reduce a number of compute resources required to perform the query. Embodiments can return results of a query in less time than previous solutions to querying such data.

As previously discussed, large volumes of videos are continuously recorded from cameras deployed for traffic control and surveillance with the goal of answering "after the fact" queries, such as identifying video frames with objects of certain classes (e.g., cars, bags, among many others) from many days of recorded video. While advancements in convolutional neural networks (CNNs) have enabled answering such queries with high accuracy, CNNs are too expensive and slow. Embodiments herein include a system for low-latency and low-cost querying on large video datasets. Embodiments can use inexpensive ingestion techniques to index videos by the objects occurring in them. At ingest-time, embodiments can use compression and video-specific specialization of CNNs. A lower accuracy of the less expensive CNNs can be handled by judiciously leveraging expensive CNNs at query-time. To reduce query-time latency, similar objects can be clustered to help avoid redundant processing. Using experiments on video streams from traffic, surveillance and news channels, embodiments use about 58 times fewer GPU cycles than running expensive ingest processors and are about 37 times faster than processing all the video at query time.

Enabling low-latency and low-cost querying over large video datasets can make video analytics more useful and open many new opportunities in video analytics and processing. An approach to enabling low-latency querying is performing all classifications with ResNet152 at ingest-time, for instance, on the live videos, and store the results in an index of object classes to video frames. Any queries for specific classes (e.g., cars) will thus involve only a simple index lookup at query-time. There are, however, at least two problems with this approach. First, the cost to index all the video at ingest-time, (e.g., $250/month/stream) is prohibitively high. Second, most of this ingest-time cost is wasteful because typically only a small fraction of recorded videos gets queried. For example, following a theft, police might query a few days of video from a few surveillance cameras, but not all the videos.

Embodiments include a system to support low-latency, low-cost querying on large video datasets. To address one or more of the above drawbacks, one or more embodiments can satisfy one or more of the following goals: (1) low cost indexing of video at ingest-time, (2) high accuracy and low latency for queries, and (3) allowing trade-offs between the cost at ingest-time against the latency at query-time. As input to one or more embodiments, a user can specify the ground-truth CNN (or "GT-CNN" (e.g., the ResNet152 classifier)) and the desired accuracy of results that are to be achieved relative to the GT-CNN.

Embodiments can use one or more of at least the following four techniques: (1) inexpensive CNNs for ingest, (2) using top-K results from the ingest-time CNN, (3) clustering similar objects, and (4) judicious selection of system and model parameters.

First, to make video ingestion inexpensive, embodiments can use compressed and specialized versions of CNNs, to create an ingest-time index of object classes to frames. CNN compression creates new CNNs with fewer convolutional layers and smaller input images. Specialization trains those CNNs on a smaller set of object classes specific to each video stream. Together, these techniques result in more efficient CNNs for video indexing.

Second, the inexpensive ingest CNNs, however, are also less accurate than the expensive GT-CNN (like ResNet152), measured in terms of recall and precision. Recall is the fraction of frames in the video that contained objects of the queried class that were returned in the query's results. Precision, on the other hand, is the fraction of frames in the query's results that contain objects of the queried class. To increase recall, embodiments can rely on an empirical observation, namely, while the top-most (e.g., most confident) classification results of the inexpensive and expensive CNNs may not always match, the top-most result of the expensive CNN falls within the top-K results of the inexpensive CNN. Therefore, at ingest-time, embodiments index each object with the top-K results of the inexpensive CNN (instead of just the top-most). To increase precision, at query-time, objects are filtered from the top-K index and then the filtered objects are classified with an expensive GT-CNN.

Third, to reduce the query-time latency of using the expensive GT-CNN, embodiments can rely on a significant similarity between objects in videos. For example, a car moving across an intersection will look very similar in consecutive frames. Embodiments can leverage this similarity by clustering the objects at ingest-time, classifying only the cluster centroids with the expensive GT-CNN at query-time, and assigning the same class to all objects in the cluster, thus considerably reducing query latency.

In summary, embodiments at ingest-time and query-time can include one or more operations as follows. At ingest-time, embodiments classify the detected objects using a inexpensive CNN, cluster similar objects, and index each cluster centroid using the top-K classification results. At query-time, when the user queries for class X, embodiments look up the ingest index for centroids that match class X and classify them using the GT-CNN. For centroids that were classified as class X, it returns all objects from the corresponding clusters to the user.

Embodiments can allow a user to choose an ingest-time CNN and corresponding parameters to meet user-specified targets on precision and recall. Among the choices that meet the accuracy targets, embodiments allow the user to trade-off between the ingest cost and query latency. For example, selecting a relatively more inexpensive ingest CNN reduces the ingest cost but increases the query latency. Embodiments can identify the "sweet spot" in parameters that sharply improve one of ingest cost or query latency for a slight increase in the other.

Using the following techniques, various examples were built and evaluated using thirteen 12-hour videos from three domains—(1) traffic cameras, (2) surveillance cameras, and (3) news channels. A comparison was made against two baselines: "Ingest-all" that runs GT-CNN on all video frames during ingest, and "Query-all" that runs GT-CNN on all the video frames at query time. ResNet152 was used as GT-CNN and augmented with motion detection to remove frames with no objects. On average, embodiments are 58 times (up to 98 times) more inexpensive than Ingest-all and 37 times (up to 57 times) faster than Query-all. This leads to the cost of ingestion coming down from about, for example, $250/month/stream to about $4/month/stream, and the latency to query a 24-hour video from 1 hour to under 2 minutes. Additional results from these techniques are discussed with reference to the figures below.

The following discussion proceeds as follows: 1. A formulation of the problem of querying video datasets by showing the trade-offs between query latency, ingest cost, and accuracy (precision and recall) of results; 2. Techniques for inexpensive ingestion of videos using compression and video-specific specialization of CNNs, while still meeting the accuracy targets; and 3. Similarities between objects are identified in a video end clustered using CNN features and significantly speeding up queries.

FIG. 1 illustrates, by way of example, a diagram of a CNN 100. The CNN 100 represents a specific class of neural networks that work by extracting visual features in images 102. During image classification, or "inference", the CNN 100 takes the input image 102 and outputs the probability of each class 104 (e.g., dog, flower, car, or other detectable object). CNNs can be used for many computer vision tasks, such as image classification and face recognition.

Broadly, CNNs consist of three types of network layers: (1) convolutional and rectification layers 106, which detect visual features from input pixels, (2) pooling layers 108, which down-sample the input by merging neighboring pixel values, and (3) one or more fully-connected layers 110, which provide the reasoning to classify the input object based on the outputs from previous layers. The outputs of an image classification CNN are the probabilities of all object classes 104. The class with the highest probability is the predicted class for the input image 102.

The output of the penultimate (i.e., previous-to-last) layer can be considered as "representative features" (e.g., extracted features 112) of the input image 102. The features are a real-valued vector, with lengths typically between 512 and 4096 in classifier CNNs. It has been shown that images with similar feature vectors (e.g., feature vectors with small Euclidean distances therebetween) are visually similar.

The high accuracy of CNNs comes at a cost. Inferring (or classifying) using CNNs to classify objects in images requires significant computational resources. This is because the higher accuracy of CNNs comes from using deeper architectures (e.g., more neural network layers) to obtain better visual features. For example, ResNet152, the winner of the ImageNet competition in 2015, has been trained to classify across 1000 classes from the ImageNet dataset using 152 layers, but can only process 77 images/second even with a high-end GPU (NVIDIA K80). This makes querying on large video datasets using these CNNs slow and costly.

There are at least two recent techniques designed to reduce the cost of CNNs. First, compression is a set of techniques aiming to reduce the cost of CNN inference (classification) at the expense of reduced accuracy. Such techniques include removing some more expensive convolutional layers, matrix pruning, and others, and can reduce the classification cost of a CNN. For example, ResNet18, which is a ResNet152 variant with only 18 layers is 8 times more inexpensive than ResNet152. A more recent technique is called CNN specialization, where the CNNs are trained on a subset of a dataset specific to a particular context, making them more inexpensive. Using the combination of inexpensive and expensive CNNs can be a part of embodiments.

Embodiments can support queries of the form, "find all frames in Y video that contain objects of class X", or similar form. Some characteristics of real-world videos towards supporting these queries can include: (1) substantial portions of videos can be excluded, (2) only a limited set of object classes occur in each video, and (3) objects of the same class have similar feature vectors. The design of some embodiments can be based on one or more of these characteristics.

About 12 hours of video from six different video streams have been analyzed based on the presently disclosed techniques. The six video streams span across traffic cameras, surveillance cameras, and news channels. Objects are detected in each frame of these videos (e.g., using background subtraction, but other techniques of object detection can be used). Each object was classified with a GT-CNN (e.g., ResNet152 CNN) for all the object classes supported by the GT-CNN (e.g., ResNet152 supports 1,000 object classes). In the discussion herein, results from the costly ResNet152 CNN are used as ground truth.

Excluding Portions of Video

There is considerable potential for avoidance of processing portions of videos at query-time. Portions of video streams either have no objects at all (as in a garage camera at night) or the objects are stationary (like parked cars). In the video sets analyzed, one-third to one-half of the frames fall into one of these categories. Therefore, queries to any object class can benefit from pre-processing filters applied to exclude these portions of the videos.

Even among the frames that do contain objects, not all the frames are relevant to a query because each query only looks for a specific class of objects. In some video sets, an object class occurs, on average, in only 0.01% of the frames, and even the most frequent object classes occur in no more than 16%-43% of the frames in the different videos. This is, at least in part, because while there are usually some dominant classes (e.g., cars in a traffic camera, people in a news channel), most other classes are rare. Since queries are for specific object classes, there is considerable potential in indexing frames by the classes of objects.

Limited Set of Object Classes in Each Video

There can be a disparity in the frequency at which classes of objects occur in each of the videos. Most video streams have a limited set of objects because each video has its own context (e.g., traffic cameras can have automobiles, pedestrians or bikes, but rarely airplanes). It is rare that a video stream contains objects of all the classes recognized by classifier CNNs.

Figure 2:
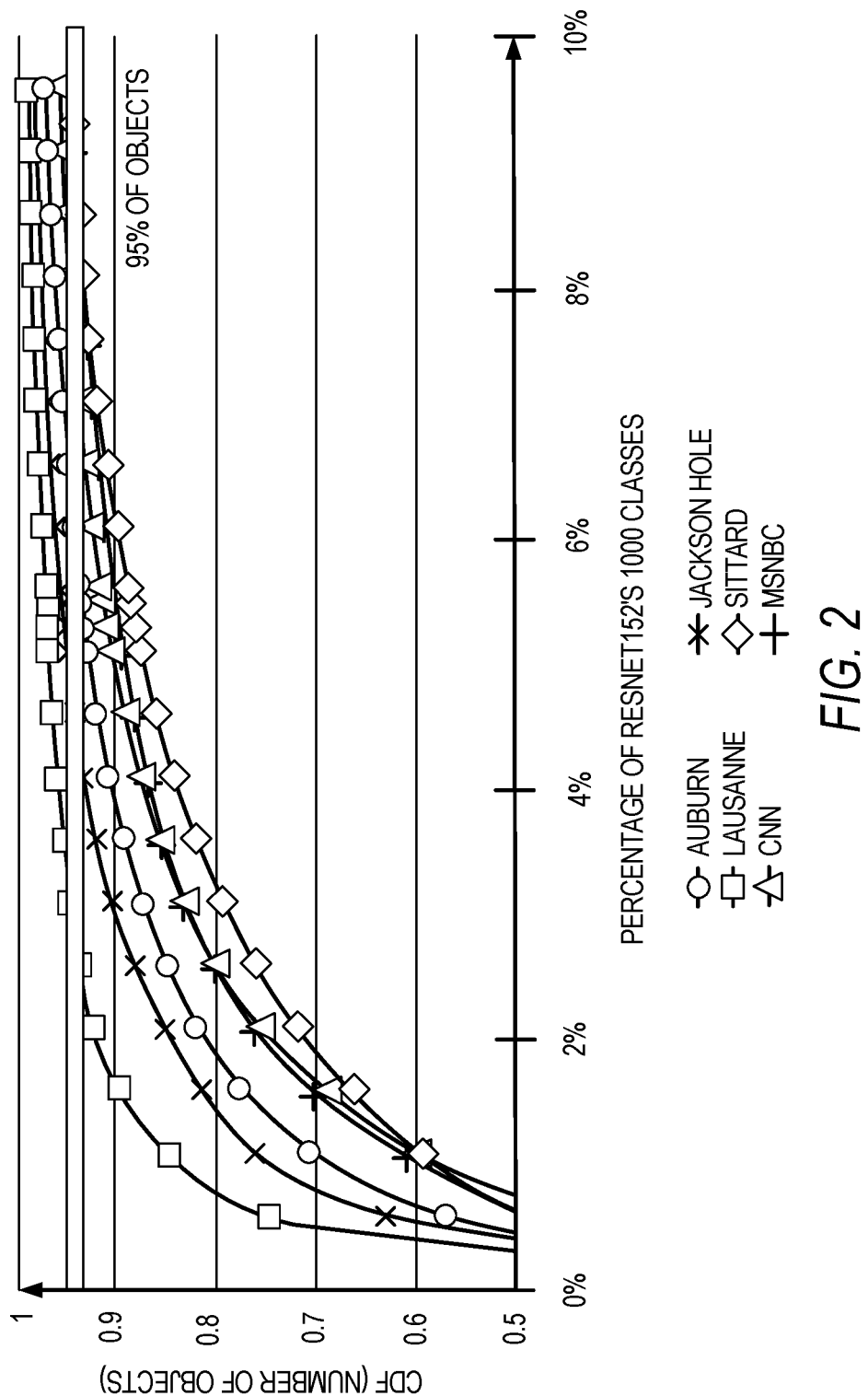
FIG. 2 illustrates, by way of example, a diagram of a cumulative distribution function (CDF) of a frequency of object classes in some videos (as classified by ResNet152).

FIG. 2 illustrates, by way of example, a diagram of a cumulative distribution function (CDF) of a frequency of object classes in some videos (as classified by ResNet152). Objects of only 22%-33% (not graphed) of the 1,000 object classes occur in the less busy videos (Auburn, Jackson Hole, Lausanne, and Sittard, explained in more detail in Table 1). Even in the busier videos (CNN, and MSNBC, explained in more detail in Table 1), objects of only 50%-69% of the classes appear. Also, there is little overlap between the classes of objects among the different videos. On average, the Jaccard indexes (e.g., intersection over union) between the videos based on their object classes is only 0:46. Even among the object classes that do occur, a small fraction of classes disproportionately dominates. According to FIG. 2, about 3%-10% of the most frequent object classes cover about 95% or more of the objects in each video stream. This suggests that for each video stream (i) a video's most frequently occurring classes can be determined and (ii) efficient CNNs specialized for classifying these classes can be trained.

Feature Vectors for Finding Duplicate Objects

Objects moving in video often stay in a frame for several seconds. For example, a pedestrian might take a minute to cross a street. Instead of classifying each instance of the same object across the frames, embodiments can classify only a single instance of duplicate objects using a CNN and apply a same label to all duplicates. Thus, given n duplicate objects, this technique can use only one CNN classification operation instead of n.

Comparing pixel values across frames is one technique to identify duplicate objects. However, pixel value comparison is highly sensitive to even slight changes in a camera's real-time view of an object. Instead, feature vectors extracted from the CNNs can be more robust than pixel value comparison, since the feature vectors are trained to extract visual features for classification. Robustness of feature vector comparison is provided in a following analysis. In each video, for each object, i, embodiments find its nearest neighbor, j, using feature vectors from an inexpensive CNN (e.g., ResNet 18) and compute a fraction of object pairs that belong to a same class. This fraction is over 99% in each of the videos, which demonstrates that feature vectors from inexpensive CNNs can be used to potentially help identify duplicate objects.

OVERVIEW OF EMBODIMENTS

Embodiments can index live video streams by the object classes of objects occurring in the video streams and enable answering "after-the-fact" queries on the stored videos of the form "find all frames that contain objects of class X". Optionally, the query can be restricted to a subset of cameras and a time range. Such a query formulation can form the basis for many widespread applications and can be used either on its own (such as for detecting all cars or bicycles in the video) or used as a basis for further processing (e.g., finding all collisions between cars and bicycles).

Embodiments can be designed to work with a wide variety of current and future CNNs. At system configuration time, a user (e.g., system administrator) provides a ground-truth CNN (e.g., GT-CNN), which can serve as an accuracy baseline for embodiments. GT-CNNs, however, are far too costly to run on every video frame.

Through a sequence of techniques, embodiments provide nearly comparable accuracy but at greatly reduced cost. By default, and throughout this discussion, the ResNet152 image classifier is used as the GT-CNN. Because the acceptable target accuracy is application-dependent, embodiments permit the user to specify the target, while providing defaults. Accuracy is specified in terms of precision (e.g., fraction of frames output by the query that contain an object of class X according to the GT-CNN), and recall, (e.g., fraction of frames that contain objects of class X according to GT-CNN that were actually returned by the query). The lower the target, the greater the cost-savings provided by embodiments. Even for high targets, such as 95%-99%, embodiments can achieve an order-of-magnitude or more cost savings.

Figure 3:
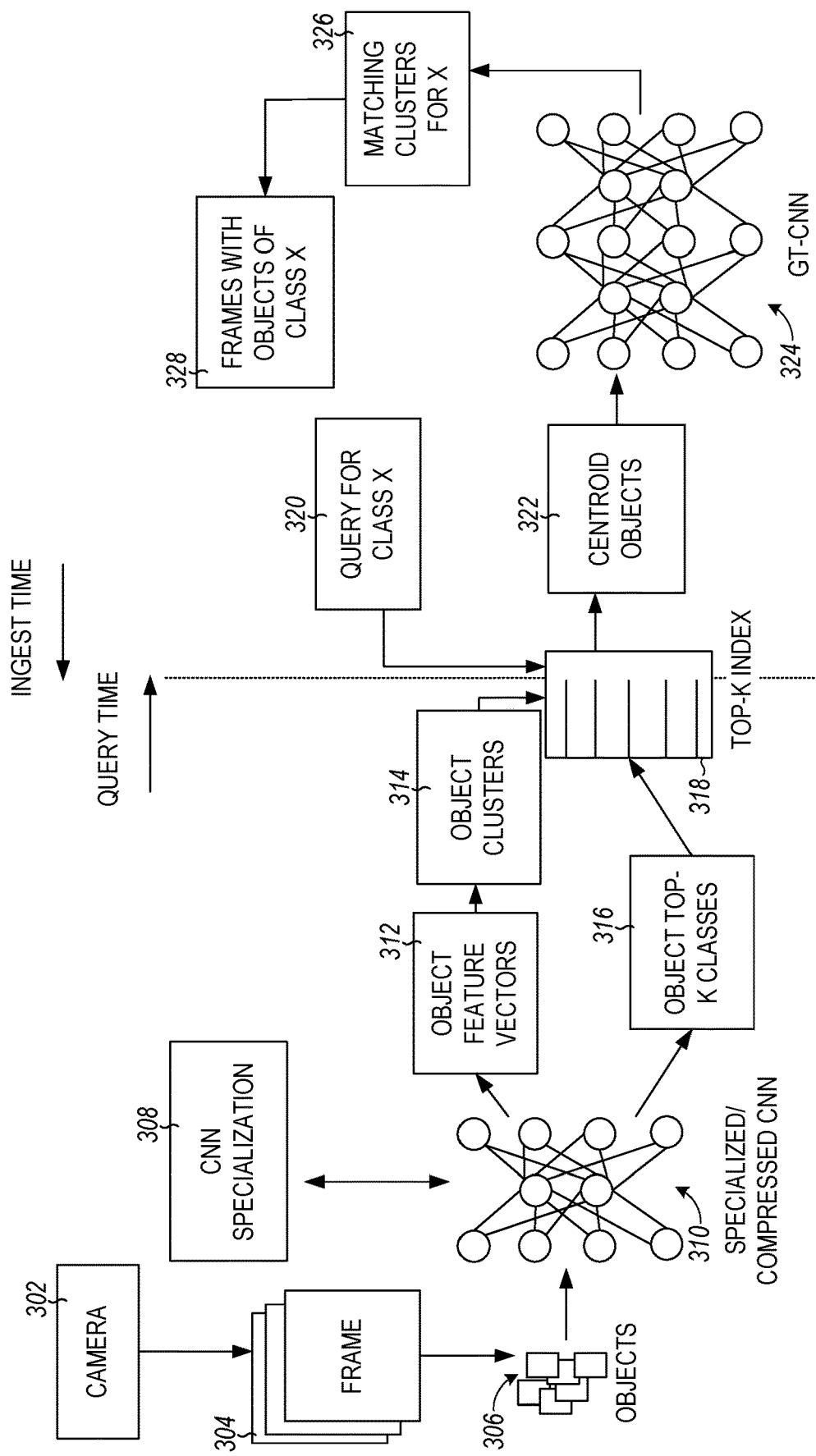
FIG. 3 illustrates, by way of example, a diagram of an embodiment of a system.

FIG. 3 illustrates, by way of example, a diagram of an embodiment of a system 300. The system 300 as illustrated includes a camera 302, video frames 304 from the camera 302, objects 306 extracted from the video frames 304, specialized and/or compressed CNN 310, object feature vectors 312, object clusters 314, object top-k classes 316, top-k index 318, a query 320, centroid objects 322, GT-CNN 324, matching cluster for class X 326, and frames with one or more objects of class X 328. The components and operations to the left of the dashed line, operate for ingest time, while components and operations to the right of the dashed line, operate for query time. Note that the top-K index 318 is generated at ingest time and used at query time.

The camera 302 can include any device capable of capturing pixel data of the video frames 304. The video frames 304 include pixel data corresponding to one or more objects in a field of view of the camera 302. The objects 306 can be extracted from the video frames 304, such as by using background subtraction or other object extraction technique. The objects 306 include pixel values of sections of a video frame 304 that are determined to include the object 306.

The CNN specialization 308 can be performed offline or online. The CNN specialization 308 can include reducing a number of layers of a GT-CNN. The CNN specialization 308 can train the reduced CNN based on objects known to be in the video frame 304 from the camera 302. Specialization of a CNN can determine the weights for the specialized and/or compressed CNN. Specialization trains the CNN to detect only a subset of all classes of objects that can be classified by the GT-CNN 324.

The specialized compressed CNN 310 can produce, as output from a penultimate layer, object feature vectors 312. The specialized compressed CNN 310 produces, as output from the last layer of the CNN, object top-K classes. The object feature vector 312 is a dimensional data vector that represents features of an object.

The object top-K classes 316 include K of the highest probabilities and corresponding classes associated with the highest probabilities. The object clusters 314 are determined based on the object feature vectors 312. The object clusters 314 includes objects with feature vectors that are within a specified distance (e.g., L1 norm, L2 norm, or the other measure of data distance) from one another.

The object clusters 314, frames in which objects in each of the object clusters 314 appear, the object top-k classes 316 to which the specialized/compressed CNN 310 determined the objects belongs, and image data of the centroid object 322 of each of the object clusters 314 can be stored in the top-k index 318. The top-k index 318 can be stored in a memory that is local or remote to the specialized and/or compressed CNN 310 and the GT-CNN 324.

The query for class X 320 can include a command to return all frames of objects that are determined to be in class X. A computer processor or other compute device, can perform operations to determine, in response to the query for class X 320, which clusters in the top-k index 318 were determined to include the class X in the object top-k classes 316. The image data for each centroid object 322, for each of the object clusters 314, can be operated on by the GT-CNN 324. The top class, as output by the last layer of the GT-CNN 324 can be used as the actual class of the objects in the object clusters 314. The matching clusters for class X 326 can be determined using the output of the GT-CNN 324 for each of the centroid objects 322. The frames with objects of class X 328 can be determined using the top-k index 318 and returned as a result of the query for class X 320.

At ingest-time (left of dashed line), embodiments can classify the objects 306 in the incoming video frames 304 and extract their feature vectors 312, using a specialized and/or compressed CNN 310. To make extracting the object feature vectors 312 and object top-k classes consume less time or fewer compute resources, embodiments can use a compressed or specialized CNN 310 (e.g., a compressed or specialized version of the GT-CNN 324). Embodiments can cluster objects 314 based on their feature vectors 312 and assign to each cluster the top-k most likely classes 316 these objects belong to (based on classification confidence of the ingest CNN 310). Embodiments create the top-k index 318, which maps each class to the set of object clusters 314 if the corresponding object cluster 314 includes the class in the object top-k classes 316. The top-k index 318 can be the output of ingest-time processing of videos of embodiments.

At query-time (right of the dashed line), in response to a user querying for a certain class X, embodiments retrieve the object clusters 314 from the top-k index 318 that include the class X in the object top-k classes 316 associated therewith. The GT-CNN 324 runs the image data (e.g., feature vector 312) of object centroids 322 of the object clusters 314 that include the class X in the object top-k classes 316 through the GT-CNN 324. The GT-CNN 324 returns a class for each of the centroid objects 322. The object clusters 314 that are determined to be class X (based on the determination that the corresponding centroid object 322 is a member of class X) are identified. All frames of the object clusters 314 whose respective centroid objects 322 were classified by the GT-CNN 324 as class X can be returned as a response to the query for class X 320.

The top-k ingest index 318 is a mapping between the object top-k classes 316 to the object clusters 314. For example, object class→<cluster ID> and <cluster ID>→ [centroid object, <objects> in cluster, <frame IDs> of objects in cluster].

Embodiments can keep ingest cost and query latency low while also meeting a user-specified accuracy targets. This is at least in part because of one or more of the following:

(1) an inexpensive ingest-time CNN (e.g., the compressed and/or specialized CNN 310). Embodiments make indexing at ingest-time more inexpensive by compressing and/or specializing the GT-CNN model for each video stream. (i) Compression of CNN models uses fewer convolutional layers and other approximation techniques. (ii) Specialization of CNNs uses the observation that specific video streams contain only a small number of object classes and their appearance is more constrained than in a generic video. Both techniques are done automatically and together result in ingest-time CNN models that are up to 98 times more inexpensive than a GT-CNN.

(2) The top-k ingest index 318 provides some improvements. The inexpensive ingest-time CNNs are less accurate (e.g., their top-most results do not often match the top-most classifications of GT-CNN). Therefore, to keep the recall high, embodiments associate each object with the top-k classification results of the specialized and/or compressed CNN 310, instead of just its top-most classification result. Increasing the value of k increases recall because the top-most results of the GT-CNN 324 often fall within the ingest-time CNN's top-k results. At query time, embodiments can use the GT-CNN 324 to remove objects in this larger set that do not match the class X, to regain precision lost by including all the top-k classes.

(3) Clustering similar objects can provide some improvements. A high value of k at ingest-time increases the work to do at query time, thereby increasing query latency. To reduce this overhead, embodiments cluster similar objects at ingest-time using feature vectors from the specialized and/or compressed CNN. In each cluster, at query-time, only the cluster centroids are run through the GT-CNN 324. The class X determined to be the most probable class by the GT-CNN 324 can be used as the class for all objects in the object cluster 314 to which the centroid 322 is associated. Thus, if the objects are not tightly clustered, clustering can reduce precision and recall.

(4) Embodiments can provide flexibility to trade off ingest-time vs. query-time costs. Embodiments automatically choose the specialized and/or compressed CNN 310, k, and specialization and clustering parameters to achieve the desired precision and recall targets. These choices also help embodiments perform a trade-off between the work done at ingest-time and query-time. For example, to save ingest work, embodiments can select a more inexpensive specialized and/or compressed CNN 310, and then counteract the resultant loss in accuracy by running the expensive GT-CNN 324 on more objects at query time. Embodiments choose parameters to offer a sharp improvement in one of the two costs for a small degradation in the optimal other cost (note the degradation is not relative to using a GT-CNN for all index and query operations, as is discussed elsewhere herein, embodiments provide improvements to both query-time and ingest-time costs). Because the desired trade-off point is application-dependent, embodiments can provide users with a choice of three or more options including: ingest-optimized, query-optimized, and balanced (the default). Note that while the explanation is anchored on image classification CNNs, the architecture of embodiments is generally applicable to all existing CNNs (e.g., face recognition or other CNNs). Techniques that are used for CNN compression and specialization, and feature extraction from the CNNs are all broadly applicable to all CNNs.

Video Ingest & Querying Techniques

In this section, techniques used in embodiments, such as using inexpensive CNN models at ingest-time, identifying similar objects and frames to save on redundant CNN processing, specializing the CNNs to the specific videos that are being analyzed, and setting parameters are described.

Inexpensive Ingestion

Embodiments can index the live videos at ingest-time to reduce the query-time latency. Object detection can be performed on each frame, typically an inexpensive operation in terms of compute cost. Then extracted objects can classified using ingest-time CNNs 310 that are more inexpensive than the ground-truth GT-CNN 324. These classifications can be used to index objects by class.

Inexpensive Ingest-Time CNN

As noted earlier, a user can provide embodiments with the GT-CNN 324. Optionally, the user can provide another classifier architecture to be used for the inexpensive CNN 310, such as AlexNet and Visual Geometry Group (VGG), which vary in their resource costs, application, and accuracies. Starting from these user-provided CNNs, embodiments can apply various levels of compression, such as removing convolutional layers and/or reducing the input image resolution. This results in a set of CNN options for ingestion, {Inexpensive $CNN_1$; ... ; Inexpensive $CNN_n$}, with a range of costs and accuracies.

Top-k Ingest Index

To keep recall high, embodiments index each object using the top-k object classes from Inexpensive $CNN_i$'s output, instead of using just the top-most class as in typical CNN output. Recall, that the output of the CNN is a list of object classes in descending order of confidence. Empirical evidence suggests that the top-most output of the expensive GT-CNN 324 is often in the top-k classes 316 output by the inexpensive CNN 310 (even for a small value of k relative to the 1,000 classes recognized by the CNNs).

Figure 4:
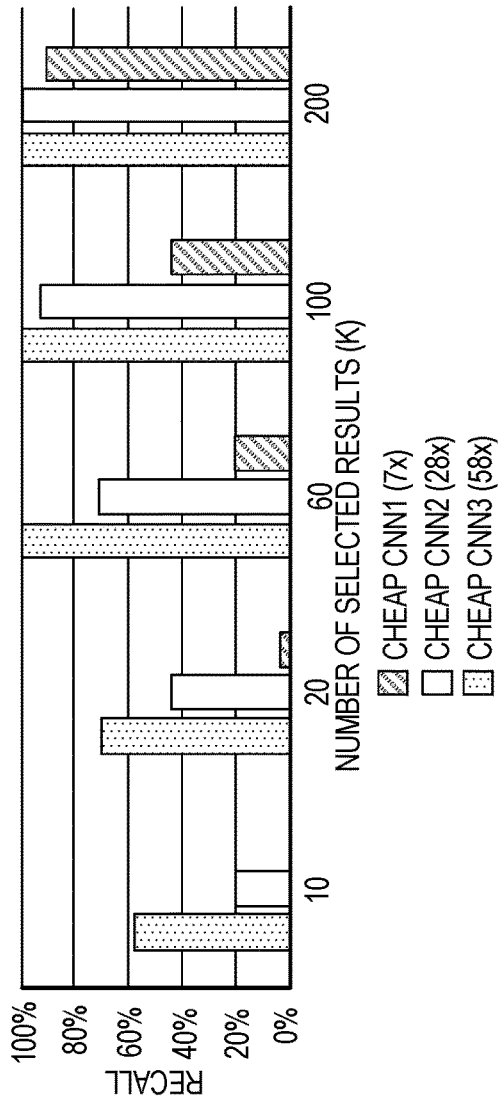
FIG. 4 illustrates, by way of example, a bar graph detailing an effect of k on recall on one of the video streams.

FIG. 4 illustrates, by way of example, a bar graph 400 detailing an effect of k on recall on one of the video streams. The three models in the figure are ResNet18, ResNet18 with 3 layers removed, and ResNet18 with 5 layers removed. Additionally, the input images were rescaled to 224, 112, and 56 pixels, respectively. All models were retrained on their original training data (ImageNet). There is an increase in recall with increasing k, for all three Inexpensive CNNs. FIG. 4 illustrates that Cheap CNN1, Cheap CNN2, and Cheap CNN3 reach 90% recall when k=60, k=100, and k=200, respectively. Note that all these models recognize 1000 classes, so even k=200 represents only 20% of the possible classes. Second, there is a trade-off between different models—the more inexpensive they are, the lower their recall with the same k. Overall, by selecting the appropriate k, embodiments can achieve a target recall.

Embodiments can create the top-k index 318 of an object's top-k classes output by a Cheap $CNN_i$ at ingest-time. While filtering for objects of the queried class X, using the top-k index (with the appropriate k) will have a high recall, but it will have very low precision. Since each object is associated with k classes (while it has only one true class), the average precision can be only 1/k. Thus, at query time, to keep the precision high, embodiments determine the actual class of objects from the top-k index using the expensive GT-CNN 324 and only return objects that match the queried class.

The selection of the inexpensive ingest-time CNN 310 model (Cheap CNN) and the k value (for the top-k results) have an influence on the recall of the outputs produced. Lower values of k reduce recall (e.g., embodiments will miss returning frames that contain the queried objects). At the same time, higher values of k increase the number of objects to classify with the GT-CNN 324 at query time to keep precision high, and hence adds to the latency. An explanation of how embodiments can set these parameters to be jointly set with other parameters is provided elsewhere herein.

Redundancy Elimination

At query time, embodiments can retrieve the objects likely matching the user-specified class from the top-k index 318 and infer their actual class using the GT-CNN 324. This can help ensure precision of 100%, but can cause significant latency at query-time. Even if this inference is parallelized across many GPUs, it can still incur a large cost. Embodiments can exploit feature vector clustering to reduce this cost. If two objects are visually similar, their feature vectors can be closely aligned (e.g., their feature vectors will be close according to a distance metric) and the associated objects will likely be classified as the same class (e.g., "cars") by the GT-CNN 324.

Embodiments can cluster objects that are similar, invoke the expensive GT-CNN 324 only on the image data for the cluster centroids 322, and assigns the centroid's label (as determined by the GT-CNN 324) to all objects in each cluster. Doing so reduces the work done by the GT-CNN 324 classifier at query-time. Embodiments can use the feature vector 312 output by the previous-to-last layer of the inexpensive ingest CNN 310 for determining the object clusters 314. Note that embodiments can cluster the objects in the frames 304 and not the frames 304 as a whole.

Given the high volume of video data, a single-pass technique can help keep the overhead lower, as the complexities of most clustering techniques are quadratic. The technique can make no assumptions on the number of clusters and can adapt to outliers in data points on the fly.

To satisfy these constraints, the following simple approach for incremental clustering can be used. Put the first object into a first cluster $c_1$. To cluster a new object i with a feature vector $f_i$, assign it to the closest cluster $c_j$ if $c_j$ is at most distance T away from $f_i$. However, if none of the clusters are within a distance T, create a new cluster with centroid at $f_i$, where T is a distance threshold. The distance can be measured as the L2 norm, L1 norm, or other norm between a feature vector of the cluster centroid and object feature vector. The number of clusters can be kept at a constant, M, by removing the smallest clusters and storing their data in the top-k index 318. Using this technique, the popular clusters (such as similar cars) can grow, while keeping the complexity as $O(M_n)$, which is linear to n, the total number of objects.

Clustering can reduce both precision and recall, depending on parameter T. If the centroid object 322 is classified by the GT-CNN 324 as the queried class X but the object cluster 314 contains another object of a different class, it reduces precision. If the centroid object 322 is classified as a class different than X but the object cluster 314 has an object of class X, it reduces recall. A discussion regarding setting T is provided elsewhere herein.

Clustering at Ingest Vs. Query Time

Embodiments can cluster the objects 306 at ingest-time rather than at query-time. Clustering at query-time can involve storing all feature vectors, loading them for objects filtered from the ingest index, and then clustering them. Instead, clustering at ingest-time creates clusters around the time the feature vectors 312 are created and only stores the cluster centroid objects 322 in the top-K index 318. This makes the query-time latency lower and reduces the size of the top-k index 318. The ordering of indexing and clustering operations is mostly commutative in practice and has minor impact on result accuracy. Embodiments can use ingest-time clustering due to its latency and storage benefits.

Pixel Differencing of Objects

Clustering primarily reduces work done at query-time (e.g., reduces a number of objects to be classified by the GT-CNN 324). Embodiments can also employ pixel differencing among objects in adjacent incoming frames, such as to reduce ingest cost. If two objects have similar pixel values, embodiments only can run the inexpensive CNN 310 on one of them and assign them both to the same object cluster 314 in the top-K index 318.

Video-Specific Specialization of CNNs

Embodiments can use an inexpensive ingest-time CNN 310, Cheap $CNN_i$ to index object classes. Embodiments can further reduce cost by specializing the ingest-time CNN 310 to each video stream. Model specialization benefits from at least two properties of objects in each video stream. First, while object classification CNNs are trained to differentiate between thousands of object classes, many video streams contain only a small number of classes. Second, objects in a specific stream are often visually more constrained than objects in general (e.g., as compared to the ImageNet dataset). The cars and buses that occur in a specific traffic camera have much less variability (e.g., they have very similar angle, distortion and size, than a generic set of vehicles).

Instead of training the CNN 310 to differentiate among thousands of object classes, the CNN 310 can be trained to differentiate among just a subset of the classes that the GT-CNN 324 can identify. This is a much simpler task than training each of the CNNs 310 to recognize all image classes. Training the CNN 310 in this manner can include using simpler image features and/or smaller image resolutions. As a result, the specialized CNNs 310 are smaller and more accurate. For example, by retraining a stream-specific Cheap $CNN_i$ to only recognize objects that occur frequently in a video stream, similar accuracy can be achieved on video streams, while removing ⅓ of the convolutional layers and making the input image 4 times smaller in resolution. This leads to the specialized Cheap $CNN_i$ being 10 times more inexpensive than even the generic Cheap $CNN_i$.

Since the specialized CNN classifies across fewer classes, the classification is more accurate, which allows embodiments to select a smaller k (for the top-k ingest index 318) to meet the desired recall. Specialized CNNs can use k=2 or 4, much smaller than a typical k=60 to about 200 for the generic inexpensive CNNs. Smaller k directly translates to fewer objects that are classified by GT-CNN 324 at query time, thus reducing latency.

Model Retraining

On each video stream, embodiments can periodically obtain some video frames and classify their objects using the GT-CNN 324 to estimate the ground truth distribution of the object classes for the video. From this distribution, embodiments can select the most frequently occurring object classes and retrain new specialized CNNs 310. There is usually a "power law" in the distribution of classes—a small subset of classes account for a dominant majority of the objects 306 in a video stream—thus, small numbers of object classes usually suffice.

Specialization can also be based off a family of CNN architectures (e.g., ResNet, AlexNet, or VGG) with different numbers of convolution layers. Specialization adds to the set of options available for ingest CNNs ({Cheap $CNN_1$; . . . ; Cheap $CNN_n$}. Embodiments can pick the best model (Cheap CNN) and the corresponding k for the index.

An "OTHER" Class

While embodiments can specialize the CNN 310 towards the most frequently occurring classes, support for querying the less frequent classes can be provided. For this purpose, embodiments can include an additional class called "OTHER" in the specialized model. Being classified as OTHER simply means not being one of the most frequently occurring classes.

At query time, if the queried class is among the OTHER classes of the ingest CNN's index 318, embodiments can extract all the object clusters 314 that match the OTHER class and classify their centroids through the GT-CNN 324. The parameter for the number of clusters (for each stream) exposes a trade-off. Using a small number of clusters allows training on a simpler model with more inexpensive ingest cost and lower query-time latency for the popular classes, however, it also leads to a larger fraction of objects falling in the OTHER class. Querying objects in the OTHER class can be expensive because all those objects will have to be classified by the GT-CNN 324. Using a larger number of clusters, on the other hand, leads to a more expensive ingest CNN 310 and query-time models, but more inexpensive querying for the OTHER classes.

Balancing Accuracy, Latency, and Cost

Embodiments' accuracy, ingest cost, and query latency can be impacted by the parameters: k, the number of top results from the ingest-time CNN 310 to index an object 306; $L_s$, the number of popular object classes used to create the specialized CNN 310, Cheap $CNN_i$, the specialized inexpensive CNN 310, and T, the distance threshold for clustering objects. The effect of these four parameters is intertwined. All the four parameters impact ingest cost, query latency, and recall, but only T impacts precision. This is, at least in part, because the cluster centroid's classification by the GT-CNN 324 is applied to all the objects in its cluster 314. Thus, if the clustering is not tight (e.g., high value of T), precision is lost.

Parameter Selection

Embodiments can select parameter values per video stream. Embodiments can sample a representative fraction of frames of the video stream and classify them using GT-CNN for the ground truth. For each combination of parameter values, embodiments can compute the expected precision and recall (using the ground truths generated by GT-CNN 324) that would be achieved for each of the object classes.

To navigate the combinatorial space of options, a two-step approach can be employed. In the first step, embodiments can choose the Cheap $CNN_i$, Ls, and k, using only the recall target. In the next step, embodiments can iterate through the values of T, the clustering distance threshold, and only select a value for T that meets the precision target.

Trading Off Ingest Cost and Query Latency

Among the combination of values that meet the precision and recall targets, the selection can be based on balancing the ingest-time and query-time costs. For example, picking a Cheap $CNN_i$ that is more accurate will have higher ingest cost, but lower query cost, because a lower k value, can be used. Using a less accurate Cheap $CNN_i$ can have the opposite effect. Embodiments can identify "intelligent defaults" that improve one of the two costs for a small worsening of the other cost (as compared to an optimal reduction of both query-time and ingest-time costs).

Figure 5:
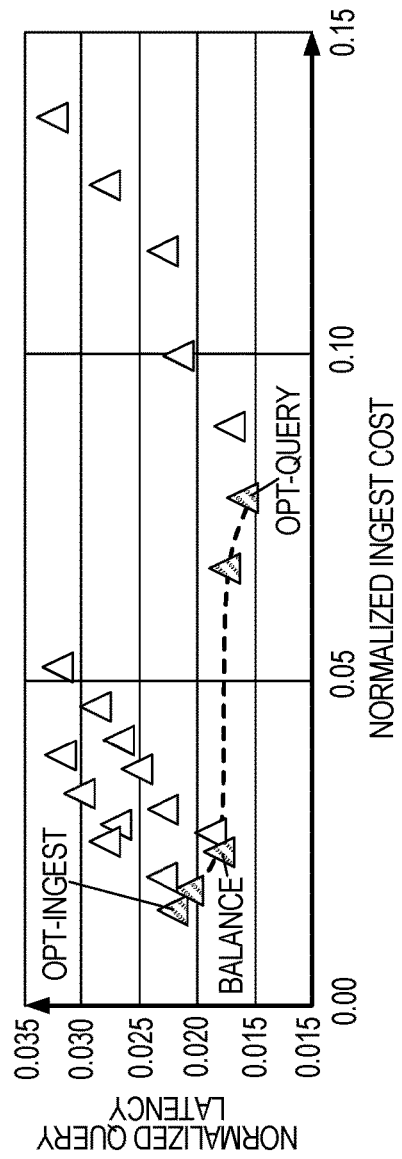
FIG. 5 illustrates, by way of example, a graph of parameter selection based on the ingest cost and query latency for one of the video streams.

FIG. 5 illustrates, by way of example, a graph of parameter selection based on the ingest cost and query latency for one of the video streams (auburn_c). FIG. 5 illustrates plots of all the "viable configurations" (e.g., sets of parameters that meet the precision and recall target) based on their ingest cost (e.g., cost of Cheap CNN) and query latency (e.g., the number of clusters according to k, Ls, and T). A Pareto boundary can be identified, which is the set of configurations that cannot improve one metric without worsening the other. Embodiments can discard all the other configurations because at least one point on the Pareto boundary is better than the other points in both metrics. Embodiments can balance between the ingest cost and query latency by selecting the configuration that minimizes the sum of ingest and query cost (e.g., measured in total GPU cycles).

Embodiments allow for other configurations based on the application's preferences and query rates. Opt-Ingest can minimize the ingest cost and is applicable when the application expects most of the video streams to not get queried (such as a surveillance cameras), as this policy also minimizes the amount of wasted ingest work. On the other hand, opt-query can minimize query latency even if it incurs a heavy ingest cost. Such flexibility allows embodiments to apply to different applications.

Implementation Details

Embodiments ingest-time work can be distributed across multiple machines, with each machine running a worker process for each video stream's ingestion. The ingest worker can receive the live video stream and extract the moving objects (using background subtraction). The embodiments can be extensible to plug in other object detectors. The detected objects can be sent to the ingest-time CNN 310 to infer the top-k classes 316 and the feature vectors 312.

The ingest worker can use the features to form the object clusters 314 in its video stream and store the top-k index 318 in a database (e.g., MongoDB, another non-relation database or a relational database), such as for retrieval at query-time. Worker processes can serve queries by fetching the relevant frames off the top-K index 318 and classifying the objects with GT-CNN 324. Work to satisfy a query can be parallelized across many worker processes, such as if resources are idle.

GPUs for CNN Classification

The inexpensive CNNs 310 and GT-CNN 324 can execute on GPUs (or other hardware accelerators for CNNs) which could either be local on the same machine as the worker processes or "disaggregated" on a remote cluster. This detail can be abstracted away from the worker process and seamlessly works with both designs.

Dynamically Adjusting k at Query-Time

A new $k_x \le k$ can be selected at query-time. Only clusters where class X appears among the top-$k_x$ classes can be extracted from the top-k index 318. This can result in fewer clusters and thus also lower query-time latency. This technique is useful in at least two scenarios: 1) some classes might be very accurately classified by the inexpensive CNN 310 and using a lower L will still meet the user-specified accuracy, yet will result in lower latency at query-time; 2) if it is desired to retrieve only some objects of class X, a lower L can be used to quickly retrieve some of the objects in the class. If more objects are required, L can be increased to return more frames with relevant objects.

Evaluation

Figure 6:
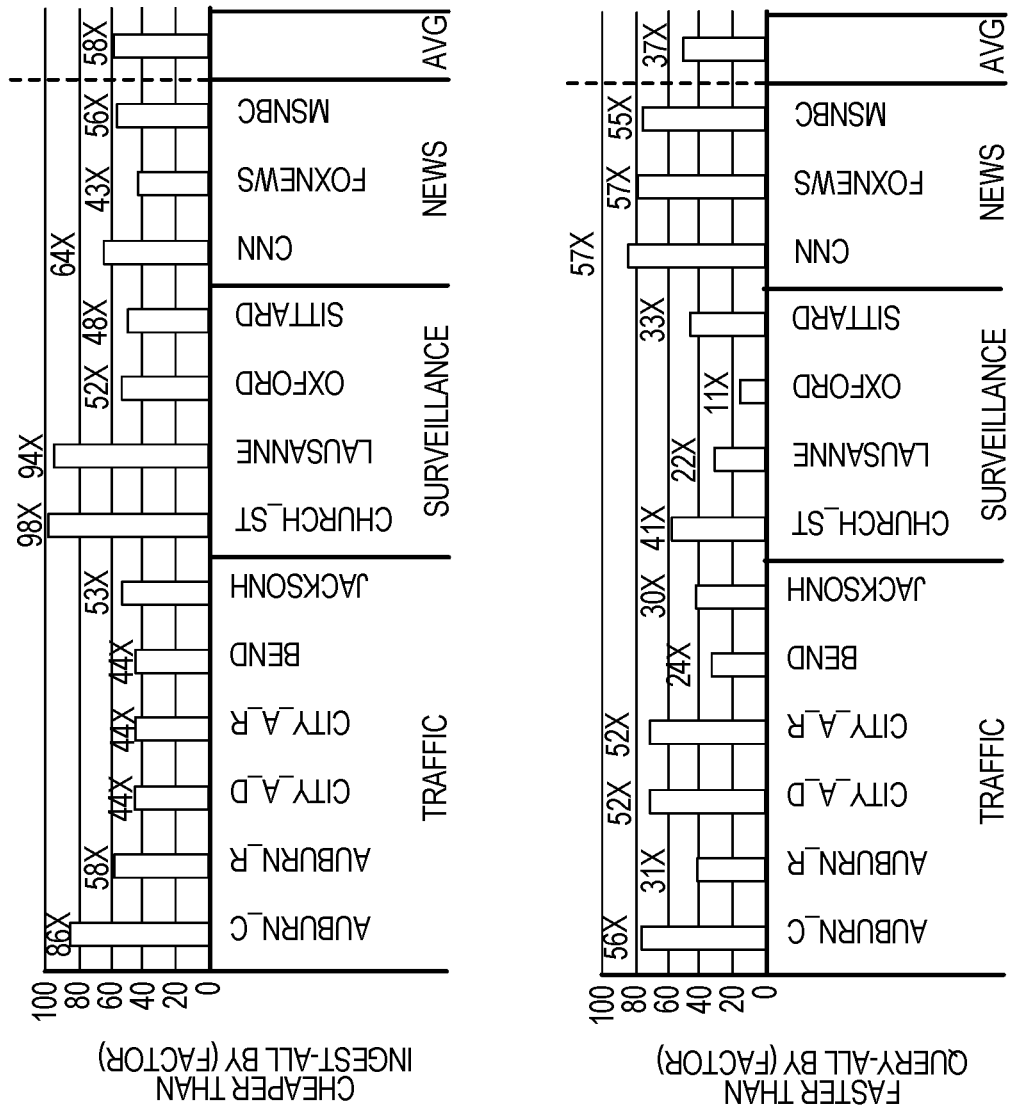
FIG. 6 illustrates by way of example, a bar graph of a general summary of evaluation results.

Some embodiments were evaluated with more than 150 hours of videos from 13 real video streams that span across traffic cameras, surveillance cameras, and news channels. FIG. 6 illustrates by way of example, a bar graph of a general summary of evaluation results. Highlights of results include: (1) On average, embodiments are simultaneously 58 times (up to 98 times) more inexpensive than the ingest-all baseline in its GPU consumption and 37 times (up to 57 times) faster than the query-all baseline in query latency, all the while achieving at least 95% precision and recall. (2) Embodiments provide a rich trade-off space between ingest cost and query latency. Among the video streams, the ingest cost is up to 141 times more inexpensive than the ingest-all baseline (and reduces query latency by 46 times) if optimizing for low-cost ingest. The query latency is reduced by up to 66 times (with 11 times more inexpensive ingest) if optimizing for query latency. (3) Embodiments are effective under broad conditions such as high accuracy targets and various frame sampling rates.

Setup

OpenCV 3.2.0 was used to decode the videos into frames, and then use the built-in background subtraction technique in OpenCV to extract moving objects from video frames. Background subtraction was used instead of object detector CNNs (e.g., YOLOv2 or Faster R-CNN) to detect objects because: (1) running background subtraction is orders of magnitude faster than running these CNNs, and (2) background subtraction can detect moving objects more reliably. CNNs were run and trained with Microsoft Cognitive Toolkit 2.1, an open-source deep learning system.

Video Datasets 13 live video streams were evaluated that span across traffic cameras, surveillance cameras, and news channels. 12 hours of each video stream were evaluated each video stream, which evenly cover day time and night time. Table 1 summarizes the video characteristics.

TABLE 1

| TYPE | NAME | LOCATION | DESCRIPTION |
|---|---|---|---|
| TRAFFIC | AUBURN_C | AL, USA | Commercial area intersection |
| TRAFFIC | AUBURN_R | AL, USA | Residential area intersection |
| TRAFFIC | CITY_A_D | USA | Downtown intersection |
| TRAFFIC | CITY_A_R | USA | Residential area intersection |
| TRAFFIC | BEND | OR, USA | Road-side camera |
| TRAFFIC | JACKSON HOLE | WY, USA | Busy intersection |
| SURVEILLANCE (SURV) | CHURCH_ST | VT, USA | Video stream rotates among cameras in a shopping mall |
| SURV | LAUSANNE | SWITZERLAND | Pedestrian plaza |
| SURV | OXFORD | ENGLAND | Bookshop street |
| SURV | SITTARD | NETHERLANDS | Market square |
| NEWS | CNN | USA | News channel |
| NEWS | FOXNEWS | USA | News channel |
| NEWS | MSNBC | USA | News channel |

By default, each video was evaluated at 30 frames per second and sensitivity was evaluated to other frame rates. In some FIGS. only a representative sample of 9 cameras are shown, such as to not obscure the view in the FIGS.

Accuracy Target

ResNet152, a state-of-the-art CNN, was used as the ground-truth CNN (GT-CNN 324). All extracted objects were evaluated with the GT-CNN 324 and the results were used as the correct answers. A class is defined as present in a one-second segment of video if the GT-CNN 324 reports such class in 50% of the frames in that segment. This criterion was used as the ground truth because the GT-CNN 324 sometimes gives different results to the exact same object in consecutive frames, and this criterion can effectively eliminate these random, erroneous results. In embodiments, the default accuracy target as 95% recall and 95% precision is set. The results are analyzed with other accuracy targets such as 97%, 98%, and 99%. Note that in most practical cases, only one of the two metrics (recall or accuracy) is high. For example, an investigator cares about high recall, and looking through some irrelevant results is an acceptable trade-off. By setting both targets high, the performance is set to a lower bound that embodiments can achieve.

Baselines and Metrics

Two baselines are used for comparisons: (1) Ingest-all, the baseline system that uses GTCNN 324 to analyze all objects at ingest time, and stores the inverted index for query; and (2) Query-all, the baseline system that simply extracts objects at ingest time, and uses the GT-CNN 324 to analyze all the objects that fall into the query interval at query time. Note both baselines are augmented with basic motion detection (background subtraction), and they do not run any GT-CNN 324 on the frames that have no moving objects.

Two performance metrics are used. The first metric is ingest cost, which is the GPU time to ingest each video. The second metric is query latency, which is the latency for an object class query. Specifically, for each video stream, all dominant object classes are evaluated and the average of their latencies is taken. Querying for non-dominant "OTHER" classes is much more inexpensive than querying popular classes, and would skew the results because there are far more such classes; thus, focus in this discussion is on the more prevalent classes). Both metrics include only GPU time spent classifying images and excludes other (CPU) time spent decoding video frames, detecting moving objects, recording and loading video, and reading and writing to the top-k index. Focus is solely on GPU time because when the GPU is involved, it is the bottleneck resource. The query latency of ingest-all is 0 and the ingest cost of query-all is 0.

Experiment Platform

The experiments were run on a local cluster. Each machine in the cluster was equipped with a graphics processing unit (GPU) (NVIDIA Titan X), 16-core Intel Xeon central processing unit (CPU) (ES-2698), 64 GB random access memory (RAM), a 40 Gb Ethernet network interface card (NIC), and operated on a 64-bit Ubuntu 16.04 long term support (LTS).

End-to-End Performance

The end-to-end performance of embodiments is shown by showing ingest cost and query latency when embodiments can balance these two metrics. FIG. 6 illustrates, by way of example, graphs of a comparison of the ingest cost of embodiments with ingest-all and the query latency of embodiments with query-all. Embodiments improve query latency with a very small ingest cost. Embodiments makes queries by an average of 37 times faster than query-all with a small cost at ingest time (an average of 58 times more inexpensive than ingest-all). With a 10-GPU cluster, the query-latency on a 24-hour video goes down from one hour to less than two minutes. The processing cost of each video stream goes down from $250/month to $4/month. This shows that embodiments can strike a balance between these two competing goals.

Further, embodiments are effective across different video streams with various characteristics. Embodiments make queries 11 times to 57 times faster with a very small ingest time cost (48 times to 98 times more inexpensive) across busy intersections (auburn_c, city_a_d and jacksonh), normal intersections or roads (auburn_r and city_a_r, bend), rotating cameras (church_st), busy plazas (lausanne and sittard), a university street (oxford), and different news channels (cnn, foxnews, and msnbc). Among these videos, the gains in query latency are smaller for relatively less busy videos (auburn_r, bend, lausanne, and oxford). This is because these videos are dominated by fewer object classes, and embodiments have more work (e.g., analysis using the GT-CNN 324) to do at query-time for these classes. According to the results, the core techniques are general and effective on a variety of real-world videos.

Effect of Different Focus Components

FIGS. 7a and 7b illustrate, by way of example, the breakdown of ingest-time cost and query latency across different design points: (1) Compressed model, which applies a generic compressed model for indexing at ingest time, (2) Compressed+ Specialized model, which uses a per-stream specialized and compressed model for indexing, and (3) Compressed+ Specialized model+ Clustering, which adds feature-based clustering at ingest time to reduce redundant work at query time. All the above include the top-k index 318 and using GT-CNN 324 at query-time, and achieve the same accuracy of 95%.

First, generic compressed models provide benefits for both ingest cost and query latency, but they are not the major source of improvement. This is at least in part because the accuracy of a generic compressed model degrades significantly when convolutional layers are removed. To retain the accuracy target, relatively expensive compressed models (Cheap $CNN_i$) and a larger k, which incur higher ingest cost and query latency, can be used. Second, specializing the CNN (in addition to compressing the CNN) reduces ingest cost and query latency. Because of fewer convolutional layers and smaller input resolution, the specialized CNNs are 7 times to 71 times more inexpensive than the GT-CNN 324, while retaining the accuracy target for each video stream. Running a specialized model at ingest time speeds up query latency by 5 times to 25 times (FIG. 7b).

Third, clustering is an effective technique to further reduce query latency with unnoticeable costs at ingest time. As FIG. 7b shows, using clustering (on top of a specialized and compressed CNN) reduces the query latency by up to 56 times. This is significantly better than just running a specialized and compressed CNN at ingest time. This gain comes with a negligible cost (FIG. 7a), because the clustering technique is run on the CPUs of the ingest machine, which is fully pipelined with the GPUs that run the specialized CNN.

Ingest Cost vs. Query Latency Trade-off

Embodiments can provide flexibility to tune its system parameters to achieve different application goals. Three alternative settings for embodiments illustrate the trade-off space between ingest cost and query latency: (1) Opt-query, which optimizes for query latency by increasing ingest cost, (2) Balance, which is the default option that balances the two metrics, and (3) Opt-ingest, which is the opposite of opt-query. Embodiments offer options in the trade-off space between ingest cost and query latency. Opt-ingest achieves 141 times more inexpensive cost than ingest-all to ingest the video stream, and makes the query 46 times faster than doing nothing at ingest (query-all). Opt-query reduces query latency by 63 times with a relatively higher ingest cost, but it is still 26 times more inexpensive than ingest-all. As they are all good options compared to the baselines, such flexibility allows a user to tailor embodiments for different contexts. For example, a traffic camera that requires fast turnaround time for queries can use opt-query, while a surveillance video stream that will be queried very rarely can use opt-ingest to reduce the amount of wasted ingest cost.

FIG. 8 illustrates, by way of example, a graph that illustrates the (I, Q) values for both opt-ingest (Opt-I) and opt-query (Opt-Q) for the representative videos. As can be seen in FIG. 8, the trade-off flexibility exists among all the videos. On average, opt-ingest has only 95 times more inexpensive ingest cost to provide 35 times query latency reduction. On the other hand, opt-query makes queries 49 times faster with a higher ingest cost (15 times more inexpensive than ingest-all). Embodiments provide flexibility between ingest cost and query latency, and make it a better fit in different contexts.

Sensitivity to Accuracy Target

Figure 9:
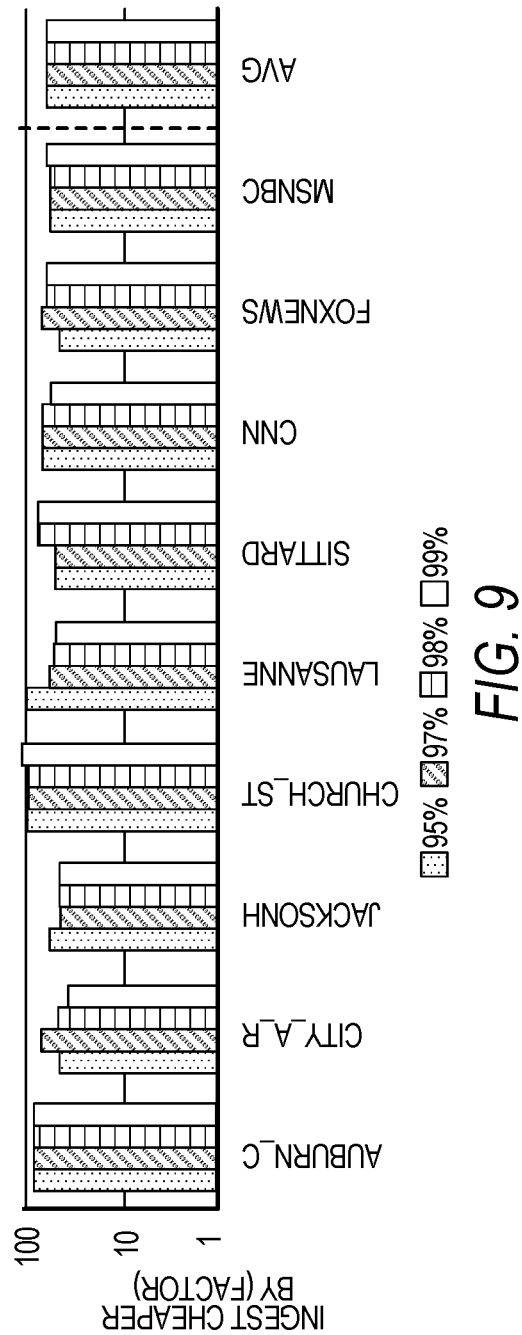
FIGS. 9 and 10 illustrate, by way of example, bar graphs of the improvements of ingest cost and query latency of embodiments compared to the baselines under different accuracy targets.
Figure 10:
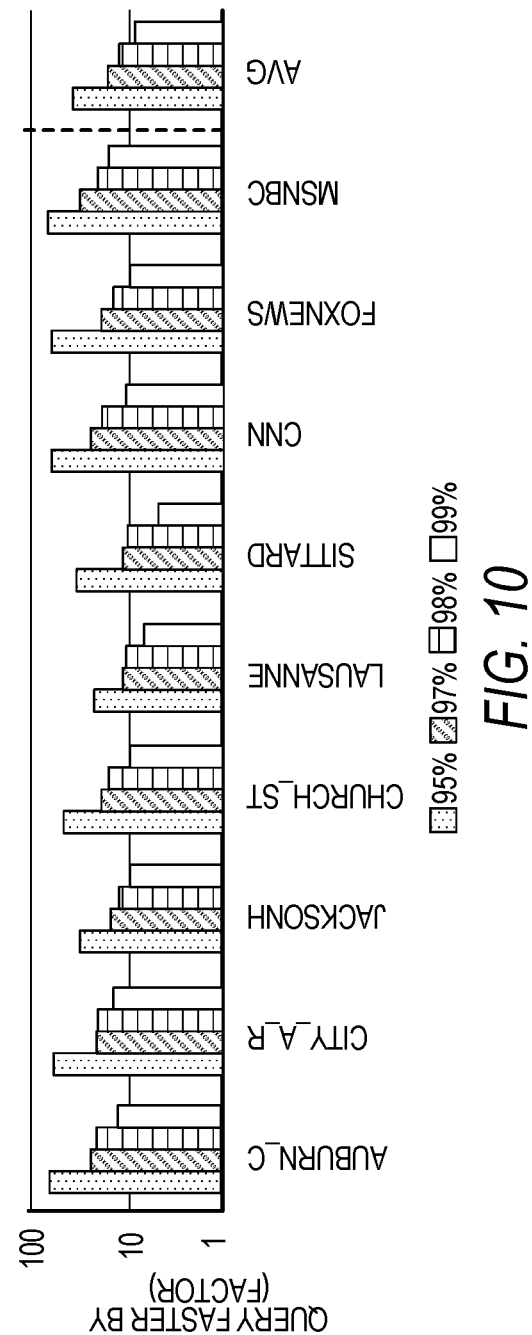

FIGS. 9 and 10 illustrate, by way of example, bar graphs of the improvements of ingest cost and query latency of embodiments compared to the baselines under different accuracy targets. Other than the default 95% accuracy target (recall and precision), three higher targets, 97%, 98%, and 99% are also evaluated. As FIGS. 9 and 10 show, with higher accuracy targets, the ingest costs are about the same, and the improvement of query latency decreases. Embodiments keep the ingest cost similar (62 times to 64 times more inexpensive than the baseline) because it still runs the specialized and compressed CNN 310 at ingest time. However, when the accuracy targets are higher, embodiments select more top-k classification results, which increases the work at query time. On average, the query latency of embodiments is faster than query-all by 15 times, 12 times, and 8_times with 97%, 98%, and 99% accuracy targets, respectively. The techniques of embodiments can achieve higher accuracy targets with significant improvements on both ingest cost and query latency.

Sensitivity to Frame Sampling

A common approach to reduce the video processing time is to use frame sampling (e.g., periodically select a frame to process). However, not all applications can use frame sampling because it can miss objects that show up and disappear within a frame sampling window. As the frame sampling rate is an application dependent choice, the sensitivity of performance of embodiments is provided for different frame rates.

Figure 11:
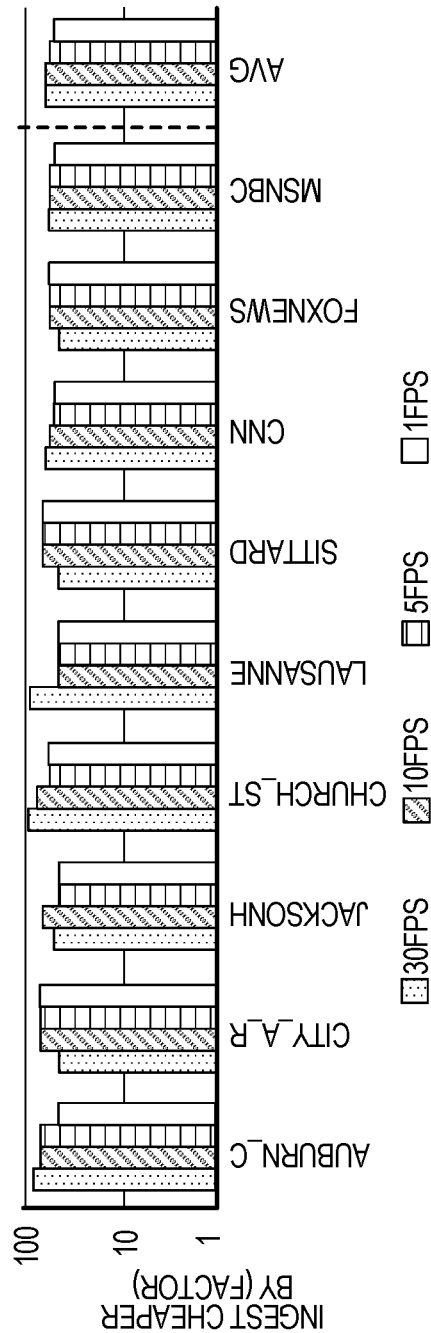
FIGS. 11 and 12, illustrate, by way of example the ingest cost and query latency of embodiments at different frame rates (e.g., 30 fps, 10 fps, 5 fps, and 1 fps) compared to ingest-all and query-all, respectively.
Figure 12:
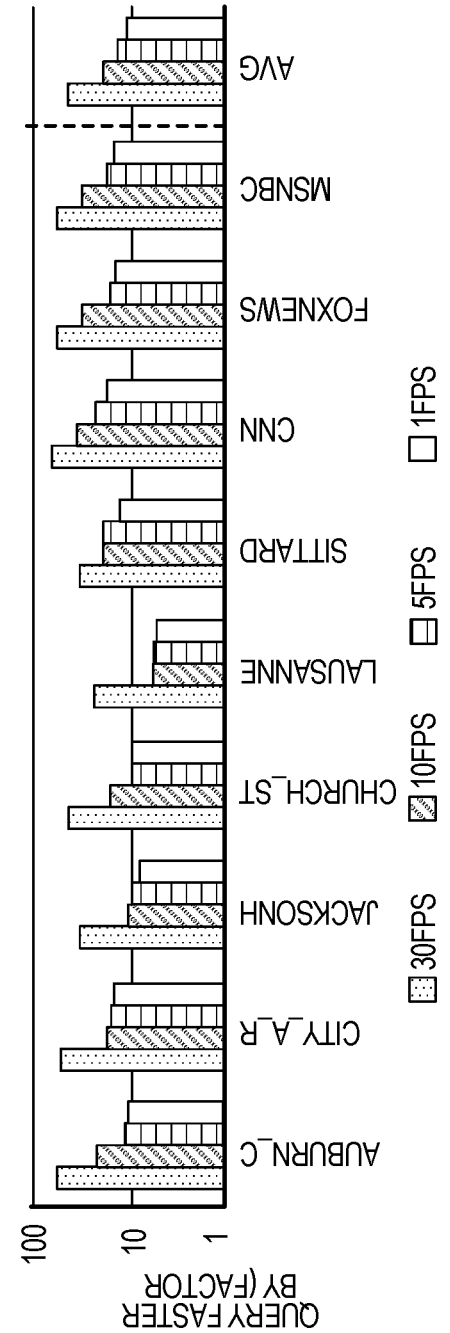

FIGS. 11 and 12, illustrate, by way of example the ingest cost and query latency of embodiments at different frame rates (e.g., 30 fps, 10 fps, 5 fps, and 1 fps) compared to ingest-all and query-all, respectively. First, the ingest cost reduction is roughly the same across the different frame rates. On average, the ingest cost of embodiments is 62 times more inexpensive than ingest-all at 30 fps, and is 58 times to 64 times more inexpensive at lower frame rates. This is because the major ingest cost saving comes from the specialized and compressed CNN 310, which are orthogonal to frame sampling rates.

Second, the query latency improvement of embodiments degrades with lower frame rates. This can be expected because one technique to reduce query latency is redundancy elimination, especially clustering similar objects using CNN feature vectors 312. At lower frame rates, the benefit of this technique reduces because there are fewer redundancies. Nonetheless, on average, embodiments are still one order of magnitude faster than query-all at a very low frame rate (1 fps).

Applicability with Different Query Rate

There are at least two factors that can affect the applicability of embodiments: 1) the number of classes that get queried over time and 2) the fraction of videos that get queried. In the first extreme case where all the classes and all the videos are queried, ingest-all can be a good option because its cost is amortized among all the queries. Even in such an extreme case, the overall cost of embodiments is still 4 times more inexpensive than ingest-all on average (up to 6 times more inexpensive) because the inexpensive CNN 310 is run at ingest time, and the GT-CNN 324 is run per object cluster only once, so the overall cost is still more inexpensive than ingest-all.

The second extreme case is when only a tiny fraction of videos gets queried. While embodiments can save the ingest cost by up to 141 times, it can be more costly than query-all if the fraction of videos gets queried is less than $1/141=0.7\%$. In such a case, nothing can be done at ingest time and all the techniques of embodiments can be run only at query time when the fraction of videos that get queried is known. While this approach increases query latency, it still reduces the query latency by an average of 22 times (up to 34 times) than query-all. Embodiments are still better than both baselines even under extreme query rates.

Answering queries of the form, "find me frames that contain objects of class X" is an important workload on recorded video datasets. Such queries are used by analysts and investigators, and it can be important to answer these queries with low latency and low cost. Embodiments herein include a system that performs low cost ingest-time analytics on live video that later facilitates low-latency queries on the recorded videos. Embodiments can use compressed and specialized CNNs at ingest-time that reduces cost. Embodiments cluster similar objects to reduce the work done at query-time, and hence the latency. Embodiments can select the ingest-time CNN and its parameters to trade-off between the ingest-time cost and query-time latency. Evaluations using 150 hours of video from traffic, surveillance, and news domains show that embodiments can reduce GPU consumption by 58 times and makes queries 37 times faster compared to current baselines. Embodiments provide an approach to querying large video datasets. Embodiments can include training a specialized and highly accurate query-time CNN for each stream and object to further reduce query latency.

Figure 13:
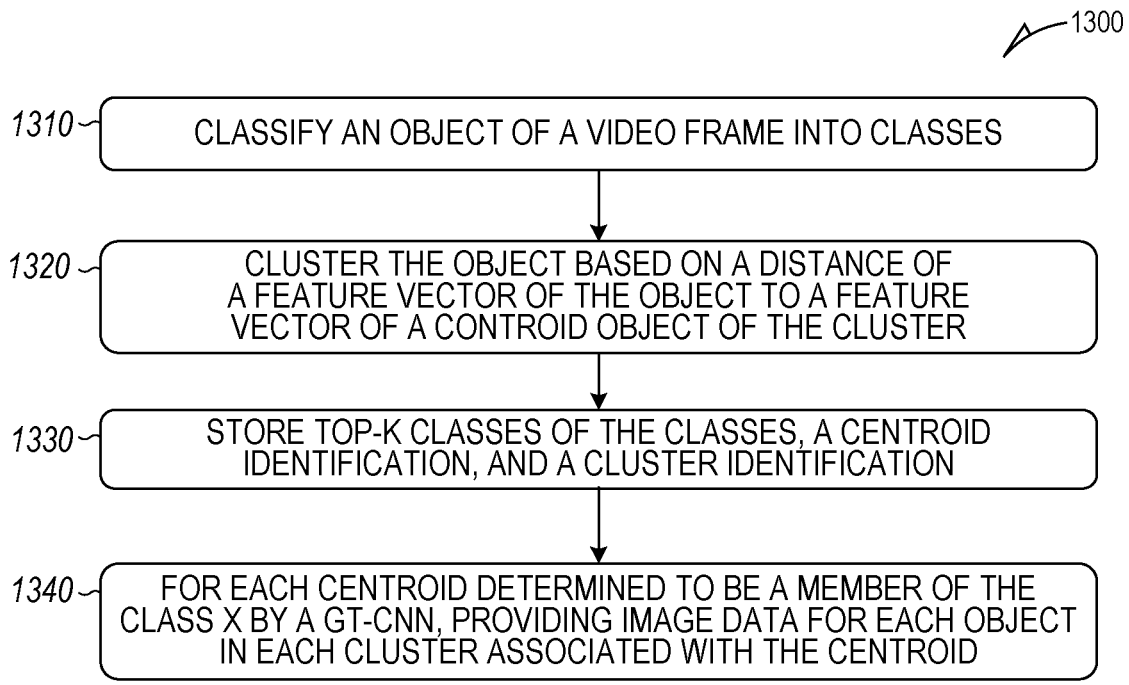
FIG. 13 illustrates, by way of example, a diagram of an embodiment of a method for video ingest, index, and/or query fulfillment.

FIG. 13 illustrates, by way of example, a diagram of an embodiment of a method 1300 for video ingest, index, and/or query fulfillment. The method 1300 includes classifying (using a compressed and specialized convolutional neural network (CNN)), an object of a video frame into classes, at operation 1310; clustering the object based on a distance of a feature vector of the object to a feature vector of a centroid object of the cluster, at operation 1320; storing (for each object) image data, top-k classes of the classes, a centroid identification (indicating a centroid of the cluster), and a cluster identification (indicating the cluster associated with the centroid), at operation 1330; and for each centroid determined to be classified as a member of a class X by a ground truth CNN (GT-CNN), providing image data for each object in each cluster associated with the centroid.

The method 1300 can further include in response to receiving a query for objects of class X from a specific video stream, retrieving image data for each centroid of each cluster that includes the class X as a member of the stored top-k classes. The method 1300 can further include classifying, using the GT-CNN, the retrieved image data for each centroid. The method 1300 can further include, wherein the compressed and specialized CNN is one of a plurality of compressed and specialized CNNs, and receiving data indicating a target recall and a target precision, and selecting the compressed and specialized CNN of the compressed and specialized CNNs and k that meet the received target recall and target precision.

The method 1300 can further include, wherein the specialized and compressed CNN includes the GT-CNN with one or more convolutional layers removed and trained to classify only a subset of the classes for which the GT-CNN has been trained. The method 1300 can further include classifying only one instance of image data of an object determined to be present in multiple video frames. The method 1300 can further include determining which classes of objects of a video stream appear in more than a threshold percentage of the video frames of the video stream, and wherein the subset of the classes includes the determined classes and an other class, wherein all objects determined to not be sufficiently close to a centroid object are associated with the other class.

The method 1300 can further include, wherein each object in each cluster is associated with top-k classes for which the object may be a member, and wherein the centroid for each cluster is associated with the top-k classes that occur most frequently in the top-k classes of the objects of the associated cluster. The method 1300 can further include reducing image resolution of the image data before classifying the image data.

Figure 14:
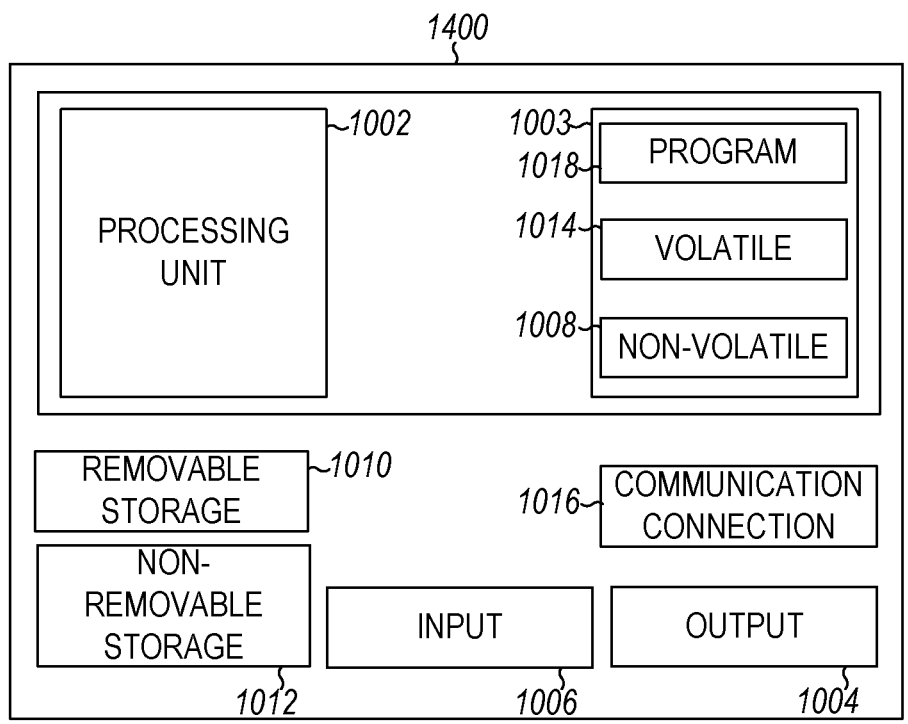
FIG. 14 illustrates, by way of example, a block diagram of an embodiment of a machine (e.g., a computer system) to implement one or more embodiments.

FIG. 14 illustrates, by way of example, a block diagram of an embodiment of a machine 1400 (e.g., a computer system) to implement one or more embodiments. One example machine 1400 (in the form of a computer), may include a processing unit 1002, memory 1003, removable storage 1010, and non-removable storage 1012. Although the example computing device is illustrated and described as machine 1400, the computing device may be in different forms in different embodiments. For example, the computing device may instead be a smartphone, a tablet, smartwatch, or other computing device including the same or similar elements as illustrated and described with regard to FIG. 14. Devices such as smartphones, tablets, and smartwatches are generally collectively referred to as mobile devices. Further, although the various data storage elements are illustrated as part of the machine 1400, the storage may also or alternatively include cloud-based storage accessible via a network, such as the Internet.

Memory 1003 may include volatile memory 1014 and non-volatile memory 1008. The machine 1400 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1400 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 1400, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 1400. A hard drive, CD-ROM, and RAM are some examples of articles including a non-transitory computer-readable medium such as a storage device. For example, a computer program 1018 may be used to cause processing unit 1002 to perform one or more methods or algorithms described herein.

ADDITIONAL NOTES AND EXAMPLES

Example 1 includes at least one machine-readable storage medium including instructions for execution by processing circuitry to perform operations comprising classifying, using a compressed and specialized convolutional neural network (CNN) implemented by the processing circuitry, an object of a video frame into classes, clustering the object based on a distance of a feature vector of the object to a feature vector of a centroid object of the cluster, storing, for each object, image data, top-k classes of the classes, a centroid identification indicating a centroid of the cluster, and a cluster identification indicating the cluster associated with the centroid, and for each centroid determined to be classified as a member of the class X, by a ground truth CNN (GT-CNN) implemented by the processing circuitry, providing image data for each object in each cluster associated with the centroid.

In Example 2, Example 1 may further include, wherein the operations further comprise in response to receiving a query for objects of class X from a specific video stream, retrieving image data for each centroid of each cluster that includes the class X as a member of the stored top-k classes, and classifying, using the GT-CNN, the retrieved image data for each centroid.

In Example 3, at least one of Examples 1-2 may further include, wherein the compressed and specialized CNN is one of a plurality of compressed and specialized CNNs, and wherein the operations further comprise receiving data indicating a target recall and a target precision, and selecting the compressed and specialized CNN of the compressed and specialized CNNs and k that meet the received target recall and target precision.

In Example 4, at least one of Examples 1-3 may further include, wherein the specialized and compressed CNN includes the GT-CNN with one or more convolutional layers removed and trained to classify only a subset of the classes for which the GT-CNN has been trained.

In Example 5, at least one of Examples 1-4 may further include, wherein the operations further comprise, classifying only one instance of image data of an object determined to be present in multiple video frames.

In Example 6, Example 4 may further include, wherein the operations further comprise determining which classes of objects of a video stream appear in more than a threshold percentage of the video frames of the video stream, and wherein the subset of the classes includes the determined classes and an other class, wherein all objects determined to not be sufficiently close to a centroid object are associated with the other class.

In Example 7, at least one of Examples 1-6 may further include, wherein each object in each cluster is associated with top-k classes for which the object may be a member, and wherein the centroid for each cluster is associated with the top-k classes that occur most frequently in the top-k classes of the objects of the associated cluster.

In Example 8, at least one of Examples 1-7 may further include, wherein the operations further comprise reducing image resolution of the image data before classifying the image data.

Example 9 includes a method, performed by at least one processor of a computing system, the method comprising classifying, using a compressed and specialized convolutional neural network (CNN), an object of a video frame into classes, clustering the object based on a distance of a feature vector of the object to a feature vector of a centroid object of the cluster, storing, for each object, image data, top-k classes of the classes, a centroid identification indicating a centroid of the cluster, and a cluster identification indicating the cluster associated with the centroid, in response to receiving a query for objects of class X from a specific video stream, retrieving image data for each centroid of each cluster that includes the class X as a member of the stored top-k classes, classifying, using a ground truth CNN (GT-CNN), the retrieved image data for each centroid, and for each centroid determined to be classified as a member of the class X, by the GT-CNN, providing image data for each object in each cluster associated with the centroid.

In Example 10, Example 9 may further include, wherein the compressed and specialized CNN is one of a plurality of compressed and specialized CNNs, and the method further comprises receiving data indicating a target recall and a target precision, and choosing the compressed and specialized CNN of the compressed and specialized CNNs and k to meet the received target recall and target precision.

In Example 11, at least one of Examples 9-10 may further include, wherein the specialized and compressed CNN includes the GT-CNN with one or more convolutional layers removed and trained to classify only a subset of the classes for which the GT-CNN has been trained.

In Example 12, at least one of Examples 9-11 may further include, classifying only one instance of image data of an object determined to be present in multiple video frames.

In Example 13, Example 11 may further include determining which classes of objects of a video stream appear in more than a threshold percentage of the video frames of the video stream, and wherein the subset of the classes includes the determined classes and an other class, wherein all objects determined to not be sufficiently close to a centroid object are associated with the other class.

In Example 14, at least one of Examples 9-13 may further include, wherein each object in each cluster is associated with top-k classes for which the object may be a member, and wherein the centroid for each cluster is associated with the top-k classes that occur most frequently in the top-k classes of the objects of the associated cluster.

In Example 15, at least one of Examples 9-14 may further include reducing image resolution of the image data before classifying the image data.

Example 16 includes a system comprising circuitry to implement a plurality of compressed and specialized convolutional neural networks (CNNs) trained to classify an object of a video frame into classes and a ground truth CNN (GT-CNN) trained to classify image data of a centroid of a cluster of clusters of objects, a processor, and a memory device coupled to the processor, the memory device including a program stored thereon for execution by the processor to perform operations, the operations comprising clustering the object based on a distance of a feature vector of the object to a feature vector of a centroid object of the cluster, storing, in the memory and for each object, a frame identification indicating one or more frames in which the object is present, top-k classes of the classes, a centroid identification indicating a centroid of the cluster, and a cluster identification indicating the cluster associated with the centroid, and for each centroid determined to be classified as a member of a class X of the classes, by the ground truth CNN (GT-CNN), providing the one or more frames associated with the frame identification for each object in each cluster associated with the centroid.

In Example 17, Example 16 may further include, wherein the operations further comprise in response to receiving a query for objects of class X from a specific video stream, retrieving image data for each centroid of each cluster that includes the class X as a member of the stored top-k classes, and using the GT-CNN, classifying the retrieved image data for each centroid.

In Example 18, at least one of Examples 16-17 may further include, wherein the operations further comprise receiving data indicating a target recall and a target precision, and choosing the compressed and specialized CNN of the compressed and specialized CNNs and k to meet the received target recall and target precision.

In Example 19, at least one of Examples 16-18 may further include, wherein a specialized and compressed CNN of the specialized and compressed CNNs includes the GT-CNN with one or more convolutional layers removed and trained to classify only a subset of the classes for which the GT-CNN has been trained to classify.

In Example 20, at least one of Examples 16-19 may further include, wherein a compressed and specialized CNN of the compressed and specialized CNNs is to classify only one instance of image data of an object determined to be present in multiple video frames.

In Example 21, Example 19 may further include, wherein the operations further comprise determining which classes of objects of a video stream appear in more than a threshold percentage of the video frames of the video stream, and wherein the subset of the classes includes the determined classes and an other class, wherein all objects determined to not be sufficiently close to a centroid object are associated with the other class.

In Example 22, at least one of Examples 16-21 may further include, wherein each object in each cluster is associated with top-k classes to which the object may be a member, and wherein the centroid for each cluster is associated with the top-k classes that occur most frequently in the top-k classes of the objects of the associated cluster.

In Example 23, at least one of Examples 16-22 may further include reducing image resolution of the image data before classifying the image data.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. At least one machine-readable storage medium including instructions for execution by processing circuitry to perform operations comprising:
   classifying, using a first machine learning (ML) technique implemented by the processing circuitry, an object of a video frame into top-k classes;
   associating the object with a cluster based on a distance of a feature vector of the object to a feature vector of a centroid object of the cluster;
   for a centroid object determined to include class X in top-k classes associated with the centroid object, classifying the centroid object, by a second, different ML technique implemented by the processing circuitry, and
   in response to the second ML technique classifying the centroid object as class X, providing image data for each object in each cluster associated with the centroid.

2. The at least one machine-readable storage medium of claim 1, wherein the first ML technique includes a convolutional neural network (CNN) and the second ML technique includes a ground truth CNN.

3. The at least one machine-readable storage medium of claim 2, wherein the first ML technique includes the ground truth CNN with one or more convolutional layers removed and the first ML technique is trained to classify only a subset of the classes for which the ground truth CNN has been trained.

4. The at least one machine-readable storage medium of claim 1, wherein the operations further comprise storing, for each object, at least two of image data, the top-k classes of the classes, a centroid identifier indicating a centroid of the cluster, and a cluster identification indicating the cluster associated with the centroid.

5. The at least one machine-readable medium of claim 1, wherein the operations further comprise:
   in response to receiving a query for objects of class X from a specific video stream, retrieving image data for each centroid of each cluster that includes the class X as a member of the top-k classes; and
   classifying, using the second ML, technique, the retrieved image data for each centroid.

6. The at least one machine-readable medium of claim 1, wherein the first ML technique is one of a plurality of first ML techniques, and wherein the operations further comprise:
   receiving data indicating a target recall and a target precision; and
   selecting the first ML technique of the first ML techniques and k that meet the received target recall and target precision.

7. The at least one machine-readable medium of claim 1, wherein the operations further comprise, classifying only one instance of image data of an object determined to be present in multiple video frames.

8. The at least one machine-readable medium of claim 1, further comprising determining which classes of objects of a video stream appear in more than a threshold percentage of the video frames of the video stream, and wherein the subset of the classes include the determined classes and an other class, wherein all objects determined to not be within a threshold distance of a centroid object are associated with the other class.

9. The at least one machine-readable medium of claim 1, wherein each object in each cluster is associated with top-k classes for which the object may be a member, and wherein the centroid for each cluster is associated with the top-k classes that occur most frequently in the top-k classes of the objects of the associated cluster.

10. The at least one machine-readable medium of claim 1, wherein the operations further comprise reducing image resolution of the image data before classifying the image data.

11. A method, performed by processing circuitry of a computing system, the method comprising:
    classifying, using a first machine learning (MIL) technique implemented by the processing circuitry, an object of a video frame into top-k classes;
    associating the object with a cluster based on a distance of a feature vector of the object to a feature vector of a centroid object of the cluster;
    for a centroid object determined to include class X in top-k classes associated with the centroid object, classifying the centroid object, by a second, different ML technique implemented by the processing circuitry, and
    in response to the second ML technique classifying the centroid object as class X, providing image data for each object in each cluster associated with the centroid.

12. The method of claim 11, wherein the first ML technique includes a convolutional neural network (CNN) and the second ML technique includes a ground truth CNN.

13. The method of claim 12, wherein the first ML technique includes the ground truth CNN with one or more convolutional layers removed and the first ML technique is trained to classify only a subset of the classes for which the ground truth CNN has been trained.

14. The method of claim 11, further comprising storing, for each object, at least two of image data, the top-k classes of the classes, a centroid identifier indicating a centroid of the cluster; and a cluster identification indicating the cluster associated with the centroid.

15. The method of claim 11, further comprising:
    in response to receiving a query for objects of class X from a specific video stream, retrieving image data for each centroid of each cluster that includes the class X as a member of the top-k classes; and
    classifying, using the second ML technique, the retrieved image data for each centroid.

16. A system comprising:
    circuitry to implement a plurality of a first machine learning (ML) techniques trained to classify an object of a video frame into classes and a second ML technique trained to classify image data of a centroid of a duster of dusters of objects;
    a processor; and
    a memory device coupled to the processor, the memory device including a program stored thereon for execution by the processor to perform operations, the operations comprising:
    clustering the object based on a distance of a feature vector of the object to a feature vector of a centroid object of the cluster; and for each centroid determined to be classified as a member of a class X of the classes, by the second ML technique, providing a frame associated with a frame identification for each object in each cluster associated with the centroid.

17. The system of claim 16, wherein the operations further comprise:
  receiving data indicating a target recall and a target precision; and
  selecting the first ML technique of the first ML techniques and k that meet the received target recall and target precision.

18. The system of claim 16, wherein the operations further comprise, classifying only one instance of image data of an object determined to be present in multiple video frames.

19. The system of claim 16, further comprising determining which classes of objects of a video stream appear in more than a threshold percentage of the video frames of the video stream, and wherein the classes include the determined classes and an other class, wherein all objects determined to not be within a threshold distance of a centroid object are associated with the other class.

20. The system of claim 16, wherein each object in each cluster is associated with top-k classes for which the object may be a member, and wherein the centroid for each cluster is associated with the top-k classes that occur most frequently in the top-k classes of the objects of the associated cluster.

* * * * *